US006760136B2

(12) United States Patent
Azuma

(10) Patent No.: US 6,760,136 B2
(45) Date of Patent: Jul. 6, 2004

(54) METHOD AND APPARATUS FOR CONFIGURING QUANTUM MECHANICAL STATE, AND COMMUNICATION METHOD AND APPARATUS USING THE SAME

(75) Inventor: Hiroo Azuma, Kanagawa-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 182 days.

(21) Appl. No.: 09/928,499

(22) Filed: Aug. 14, 2001

(65) Prior Publication Data

US 2002/0048059 A1 Apr. 25, 2002

Related U.S. Application Data

(62) Division of application No. 09/379,601, filed on Aug. 24, 1999, now Pat. No. 6,301,029.

(30) Foreign Application Priority Data

Aug. 26, 1998 (JP) ............................................. 10-240255
Oct. 26, 1998 (JP) ............................................. 10-303939

(51) Int. Cl.[7] .................................................. G02F 3/00
(52) U.S. Cl. ...................................... 359/108; 359/107
(58) Field of Search ................................ 359/107, 108, 359/1, 15; 250/225, 292; 257/432, 14; 324/307; 380/59

(56) References Cited

U.S. PATENT DOCUMENTS

| | | | |
|---|---|---|---|
| 5,248,883 A | 9/1993 | Brewer et al. .............. | 250/282 |
| 5,379,000 A | 1/1995 | Brewer et al. ................. | 331/3 |
| 5,764,765 A | * 6/1998 | Phoenix et al. ............... | 380/59 |
| 5,793,091 A | 8/1998 | Devoe ......................... | 257/21 |
| 5,838,436 A | 11/1998 | Hotaling et al. ............ | 356/345 |
| 5,917,322 A | 6/1999 | Gershenfeld et al. ....... | 324/300 |
| 6,057,541 A | 5/2000 | Steenblik .................... | 250/225 |
| 6,301,029 B1 | * 10/2001 | Azuma ........................ | 359/107 |
| 6,472,681 B1 | * 10/2002 | Kane ............................ | 257/14 |

OTHER PUBLICATIONS

Shor, Peter W., "Polynomial–Time Algorithms For Prime Factorization And Discrete Logarithms On A Quantum Computer", Siam J. Comput., vol. 26, No. 5, pp. 1484–1509 (Oct. 1997).

Shor, Peter, "Algorithms For Quantum Computation: Discrete Logarithms And Factoring", 35th Annual Symposium on Foundations of Computer Science, Nov. 20–22, 1994, Santa Fe, New Mexico, IEEE, pp. 124–134 (1994).

Ekert, Artur, et al., "Quantum Computation And Shor's Factoring Algorithm", Reviews of Modern Physics, vol. 68, No. 3, pp. 733–753 (Jul. 1996).

Grover, Lov K., "Quantum Mechanics Helps In Searching For a Needle In A Haystack", Physical Review Letters, vol. 79, No. 2, pp. 325–328 (Jul. 14, 1997).

Wineland, D.J., et al., "Spin Squeezing And Reduced Quantum Noise In Spectroscopy", Physical Review, vol. 46, No. 11, pp. R6797–R6800 (Dec. 1, 1992).

Wineland, D.J., et al., "Squeezed Atomic States And Projection Noise In Spectroscopy", Physical Review, vol. 50, No. 1, pp. 67–88 (Jul. 1994).

(List continued on next page.)

Primary Examiner—Salvatore Cangialosi
(74) Attorney, Agent, or Firm—Fitzpatrick, Cella, Harper & Scinto

(57) ABSTRACT

If a quantum mechanical state including a plurality of two-level systems $(x_1, x_2, \ldots, x_{2p+1})$ is expressed by a superposition of orthonormal bases in which each two-level system assumes a basic or an excited state, a quantum gate network is used to perform an operation including a combination of a selective rotation operation and an inversion about average operation D in order to configure a desired partly-entangled quantum mechanical state in which the coefficients of the respective bases are all real numbers.

16 Claims, 17 Drawing Sheets

OTHER PUBLICATIONS

Kitagawa, Masahiro, et al., "Nonlinear–Interferometric Generation Of Number–Phase–Correlated Fermion States", Physical Review Letters, vol. 67, No. 14, pp. 1852–1854 (Sep. 30, 1991).

Huelga, S.F., et al., "Improvement Of Frequency Standards With Quantum Entanglement", Physical Review Letters, vol. 79, No. 20, pp. 3865–3868 (Nov. 17, 1997).

Cleve, Richard, et al., "Schumacher's Quantum Data Compression As A Quantum Computation", Physical Review, vol. 54, No. 4, pp. 2636–2650 (Oct. 1996).

Barenco, Adriano, et al., "Elementary Gates For Quantum Computation", Physical Review, vol. 52, No. 5, pp. 3457–3467 (Nov. 1995).

Cirac, J.I., et al. "Quantum Computations With Cold Trapped Ions", Physical Review Letters, vol. 74, No. 20, pp. 4091–4098, (May 15, 1995).

* cited by examiner

↓ D (INVERSION ABOUT AVERAGE)

↓ $R_x$ (SELECTIVE ROTATION)

n QUBITS m QUBITS (n+1) QUBITS $\Lambda_{n-1}(\sigma_x)$ GATE ON (n+1)-QUBIT NETWORK

| n | $\Lambda_2(\sigma_x)$ | $\Lambda_1(\sigma_x)$ | TOTAL |
|---|---|---|---|
| 2 | 0 | 1 | 1 |
| 3 | 1 | 0 | 1 |
| 4 | 4 | 0 | 4 |
| 5 | 10 | 0 | 10 |
| 6 | 16 | 0 | 16 |
| 7≦n | 8(n−4) | 0 | 8(n−4) |

$\Lambda_n(R_z(\alpha))$ GATE ON (n+1)-QUBIT NETWORK

| n | $\Lambda_2(\sigma_x)$ | $\Lambda_1(\sigma_x)$ | $\Lambda_0$ | TOTAL |
|---|---|---|---|---|
| 1 | 0 | 2 | 2 | 4 |
| 2 | 0 | 6 | 4 | 10 |
| 3 | 2 | 4 | 4 | 10 |
| 4 | 8 | 4 | 4 | 16 |
| 5 | 20 | 4 | 4 | 28 |
| 6 | 32 | 4 | 4 | 40 |
| n≧7 | 16(n−4) | 4 | 4 | 8(2n−7) |

METHOD AND APPARATUS FOR CONFIGURING QUANTUM MECHANICAL STATE, AND COMMUNICATION METHOD AND APPARATUS USING THE SAME

This is a divisional application of application Ser. No. 09/379,601, filed on Aug. 24, 1999, and allowed on Apr. 23, 2001 now U.S. Pat. No. 6,301,029.

BACKGROUND OF THE INVENTION

1. Field of the Invention

The present invention relates to a method and apparatus for configuring a quantum mechanical state required for quantum information processing, quantum communication, or quantum precision measurements, as well as a communication method and apparatus using such a method and apparatus.

2. Related Background Art

The fields of quantum computations (see R. P. Feynman, "Feynman Lectures on Computation," Addison-Wesley (1996)) and quantum information theories are advancing rapidly. In these fields, superposition, interference, and an entangled state, which are the basic nature of quantum mechanics, are ingeniously utilized.

In the field of quantum computations, since the publication of Shor's algorithm concerning factorization (see P. W. Shor, "Polynomial-Time Algorithms for Prime Factorization and Discrete Logarithms on a Quantum Computer," LANL quantum physics archive quant-ph/9508027. Similar contents are found in SIAM J. Computing 26 (1997), 1484. In addition, the first document is P. W. Shor, "Algorithms for quantum computation: Discrete logarithms and factoring," in Proceedings of the 35th Annual Symposium on Foundations of Computer Science (ed. S. Goldwasser) 124–134 (IEEE Computer Society, Los Alamitos, Calif., 1994). A detailed description is found in Artur Ekert and Richard Jozsa, "Quantum computation and Shor's factoring algorithm," Rev. Mod. Phys. 68, 733 (1996)) and Grover's algorithm concerning the search problem (L. K. Grover, "A fast quantum mechanical algorithm for database search," LANL quantum physics archive quant-ph/9605043. Almost similar contents are found in L. K. Grover, "Quantum Mechanics Helps in Searching for a Needle in a Haystack," Phys. Rev. Lett. 79, 325 (1997)), many researchers have been proposing methods for implementing quantum computations and developing new quantum algorithms.

On the other hand, in the field of quantum information theories, the entangled state has been known to play an important role due to its unlikelihood to be affected by decoherence (see C. H. Bennett, C. A. Fuchs, and J. A. Smolin, "Entanglement-Enhanced Classical Communication on a Noisy Quantum Channel," Quantum Communication, Computing, and Measurement, edited by Hirota et al., Plenum Press, New York, p. 79 (1997)).

Furthermore, as an application of these results, a method for overcoming the quantum shot noise limit using (n) two-level entangled states has been established through experiments on Ramsey spectroscopy (see D. J. Wineland, J. J. Bollinger, W. M. Itano, F. L. Moore, and D. J. Heizen, "Spin squeezing and reduced quantum noise in spectroscopy," Phys. Rev. A 46}, R6797 (1992) or D. J. Wineland, J. J. Bollinger, W. M. Itano, and D. J. Heizen, "Squeezed atomic states and projection noise in spectroscopy," Phys. Rev. A 50, 67 (1994)). Despite the lack of discussion of the two-level Ramsey spectroscopy, a similar concept is described in M. Kitagawa and M. Ueda, "Nonlinear-Interferometric Generation of Number-Phase-Correlated Fermion States," Phys. Rev. Lett. 67, 1852 (1991).

If decoherence in the system caused by the environment is negligible, the maximally entangled state serves to improve the accuracy in measuring the frequency of an energy spectrum.

In this case, the fluctuation of the frequency decreases by $1/\sqrt{n}$. With decoherence in the system considered, however, the resolution achieved by the maximally entangled state is only equivalent to that achieved by an uncorrelated system.

In addition, the use of a partly entangled state having a high symmetry has been proposed in S. F. Huelga, C. Macchiavello, T. Pellizzari, A. K. Ekert, M. B. Plenio, J. I. Cirac, "Improvement of Frequency Standards with Quantum Entanglement," Phys. Rev. Lett. 79, 3865 (1997).

If optimal parameters (coefficients of basic vectors) can be selected beforehand, this method can provide a higher resolution than the maximally entangled or uncorrelated state.

The partly entangled state having a high symmetry is given by the following equation:

$$|\psi_n\rangle = \sum_{k=0}^{\lfloor n/2 \rfloor} a_k(|k\rangle)_s \text{ for } n \geq 2 \qquad (1)$$

where (n) represents the number of qubits that are two-level particles constituting a state, and $\lfloor n/2 \rfloor$ represents a maximum integer not more than n/2. $\{a_k\}$ is a real number wherein, for example, an optimal combination of values are assumed to be provided beforehand so as to provide a high resolution in the Ramsey spectroscopy. In this case, $\{a_k\}$ may be a constant.

$|k\rangle_s$ is a superposition of states in which (k) or (n–k) qubits are excited, wherein the superposition is established using an equal weight. For example, $|\psi_4\rangle$ is given by the following equation.

$$|\psi_4\rangle = a_0|0\rangle + a_1|1\rangle + a_2|2\rangle$$
$$= a_0(|0000\rangle + |1111\rangle) +$$
$$a_1(|0001\rangle + |0010\rangle + |0100\rangle + |1000\rangle + |1110\rangle + |1101\rangle +$$
$$|1011\rangle + |0111\rangle) + a_2(|0011\rangle + |0101\rangle + |0110\rangle + |1001\rangle +$$
$$|1010\rangle + |1100\rangle)$$

These states have symmetry such as that described below.
  Invariable despite the substitution of any two qubits
  Invariable despite the simultaneous inversion of $\{|0\rangle, |1\rangle\}$ for each qubit.

To conduct experiments on the Ramsey spectroscopy using a partly entangled state having a high symmetry, a target entangled state must be provided as soon as possible as an initial system state before decoherence may occur. Thus, all actual physical systems have a decoherence time, and quantum mechanical operations must be performed within this time. This is a problem in not only quantum precision measurements but also quantum communication and general quantum computations.

In addition, to configure the target entangled state from a specified state, an operation using basic quantum gates must be performed out many times. Minimizing this number of times leads to the reduction of the time required to provide the target entangled state.

In addition, to configure a quantum gate network for obtaining the target entangled state, a conventional computer must be used to determine in advance which qubits will be controlled by the basic quantum gates, the order in which the basic quantum gates will be used, and a rotation parameter for unitary rotations. The amount of these computations is desirably reduced down to an actually feasible level.

SUMMARY OF THE INVENTION

Thus, an object of the present invention is to provide a method used to configure a target entangled state within a decoherence time in an actual physical system, for configuring the desired state using as less steps as possible if the computation time is evaluated based on the total number of basic quantum gates.

Another object of the present invention is to provide an effective procedure used in configuring a network consisting of basic quantum gates, for using a conventional computer to determine in advance which be qubits will be controlled by the basic quantum gates, the order in which the basic quantum gates will be used, and a unitary rotation parameter.

Yet another object of the present invention is to provide a method and apparatus for configuring not only a partly entangled state having a high symmetry but also a partly entangled state defined by a function with an even number of collisions, using as less steps as possible if the computation time is evaluated based on the total number of basic quantum gates.

According to one aspect, the present invention which achieves these objects relates to a method for configuring a quantum mechanical state consisting of a plurality of two-level systems wherein if a superposition of orthonormal bases in which each two-level system assumes a basic or an excited state is used for expression, a desired partly-entangled quantum mechanical state in which the coefficients of the bases are all real numbers is configured using an operation that is a combination of a selective rotation operation and an inversion about average operation.

According to one aspect, the present invention which achieves these objectives relates to a state configuration apparatus comprising a selective rotation operation means for a plurality of two-level systems and an inversion about average operation means for the plurality of two-level systems, wherein if a quantum mechanical state consisting of the plurality of two-level systems is expressed by a superposition of orthonormal bases in which each two-level system assumes a basic or an excited state, a desired partly-entangled quantum mechanical state in which the coefficients of the bases are all real numbers is configured using an operation that is a combination of an operation performed by the selective rotation operation means and an operation performed by the inversion about average operation means.

Other objectives and advantages besides those discussed above shall be apparent to those skilled in the art from the description of a preferred embodiment of the invention which follows. In the description, reference is made to accompanying drawings, which form a part thereof, and which illustrate an example of the invention. Such an example, however, is not exhaustive of the various embodiments of the invention, and therefore reference is made to the claims which follow the description for determining the scope of the invention.

DETAILED DESCRIPTION OF THE PREFERRED EMBODIMENTS

Figure 1:
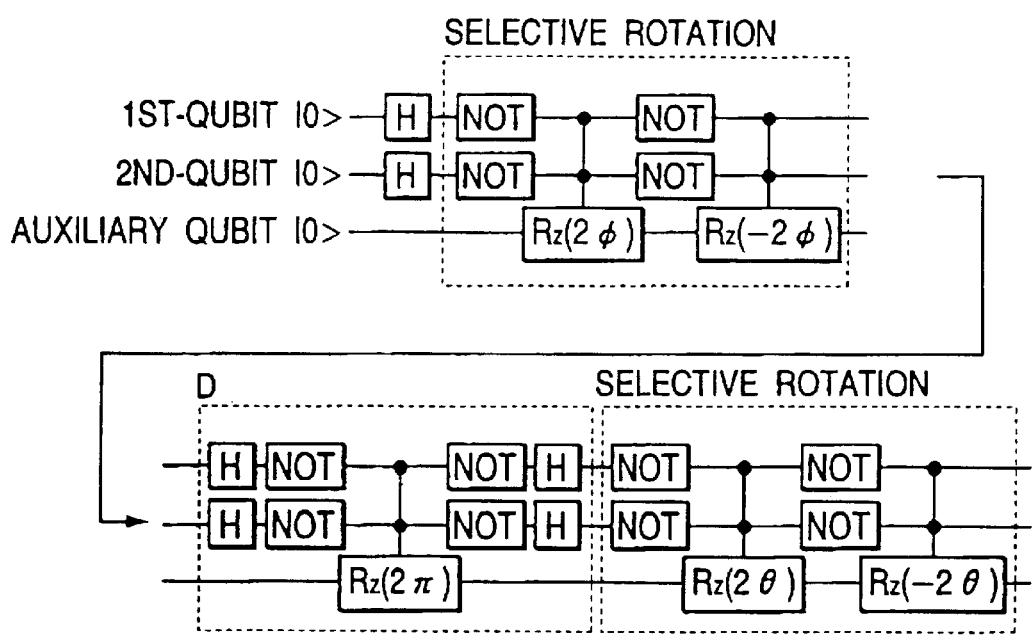
FIG. 1 is a Feynman diagram of a quantum gate network showing a case in which the "first trial method" does not use a second register for n=2.
Figure 2:
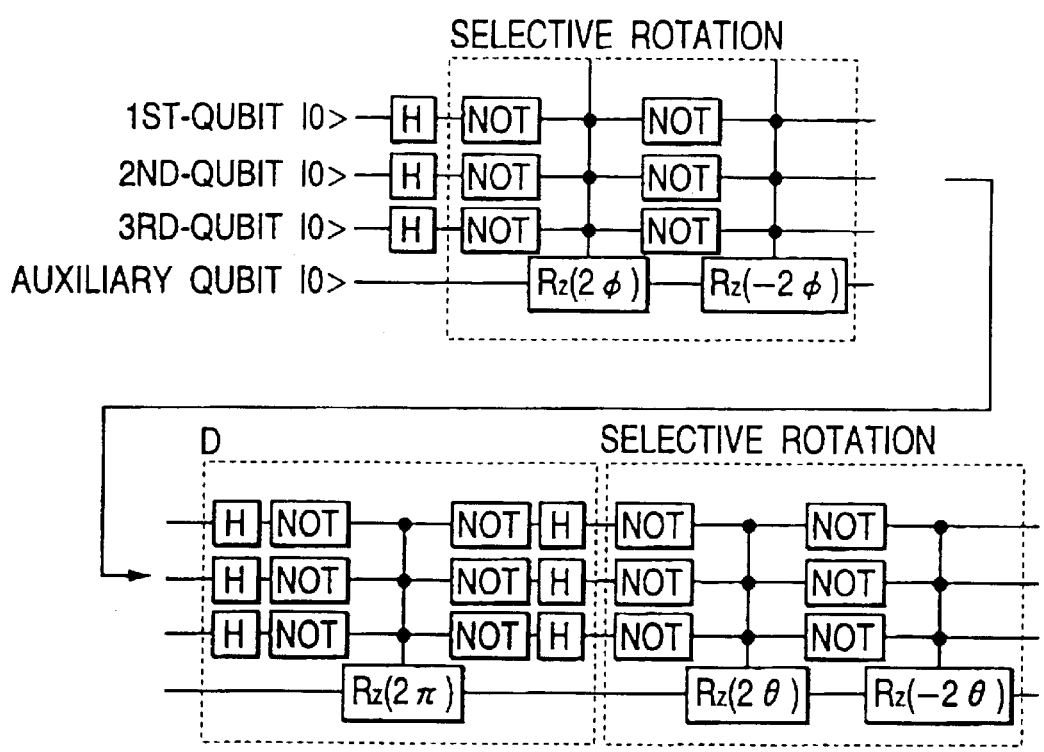
FIG. 2 is a Feynman diagram of the quantum gate network showing a case in which the "first trial method" does not use the second register for n=3.
Figure 3:
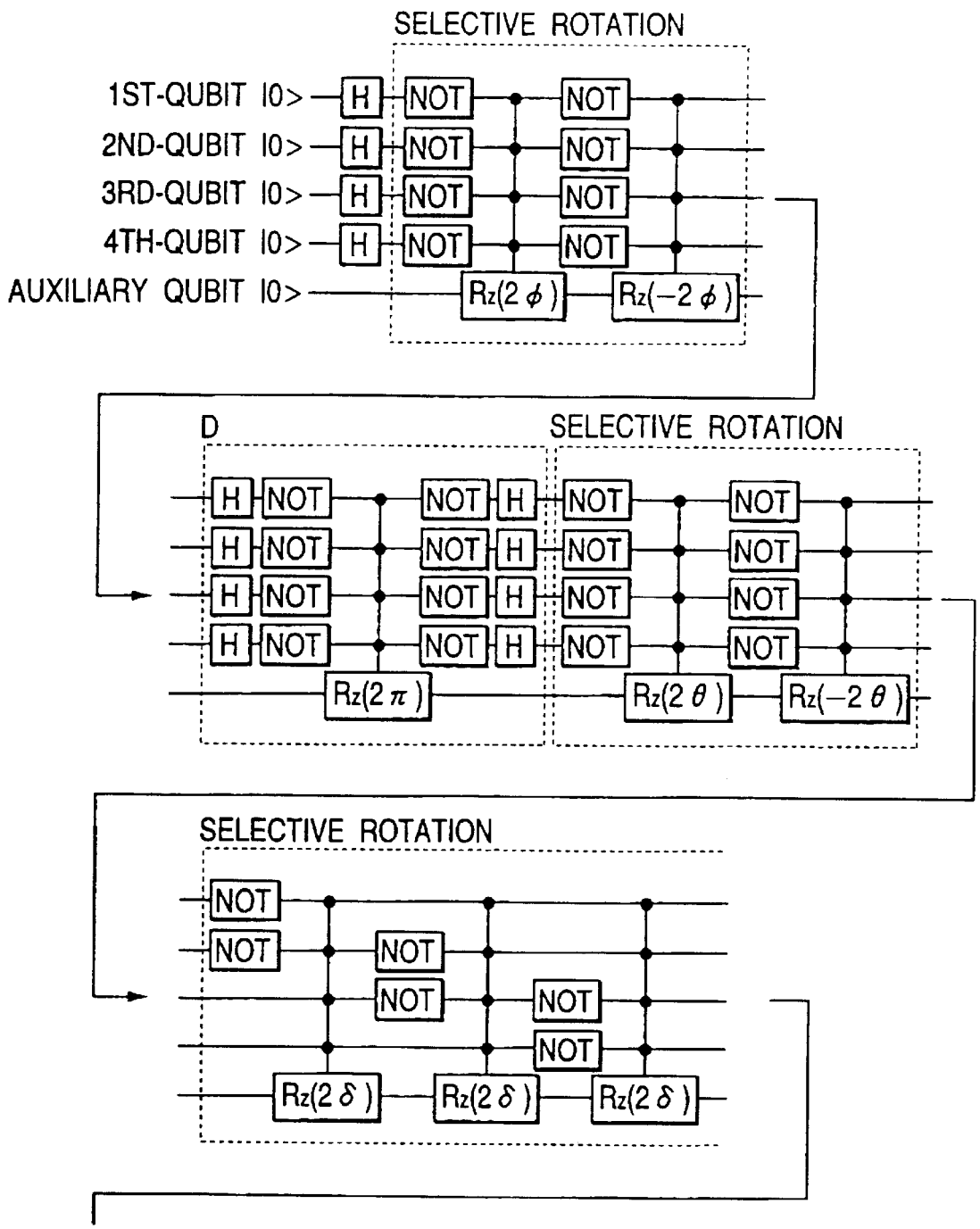
FIG. 3 is a Feynman diagram of the quantum gate network showing a case in which the "first trial method" does not use the second register for n=4.
Figure 4:
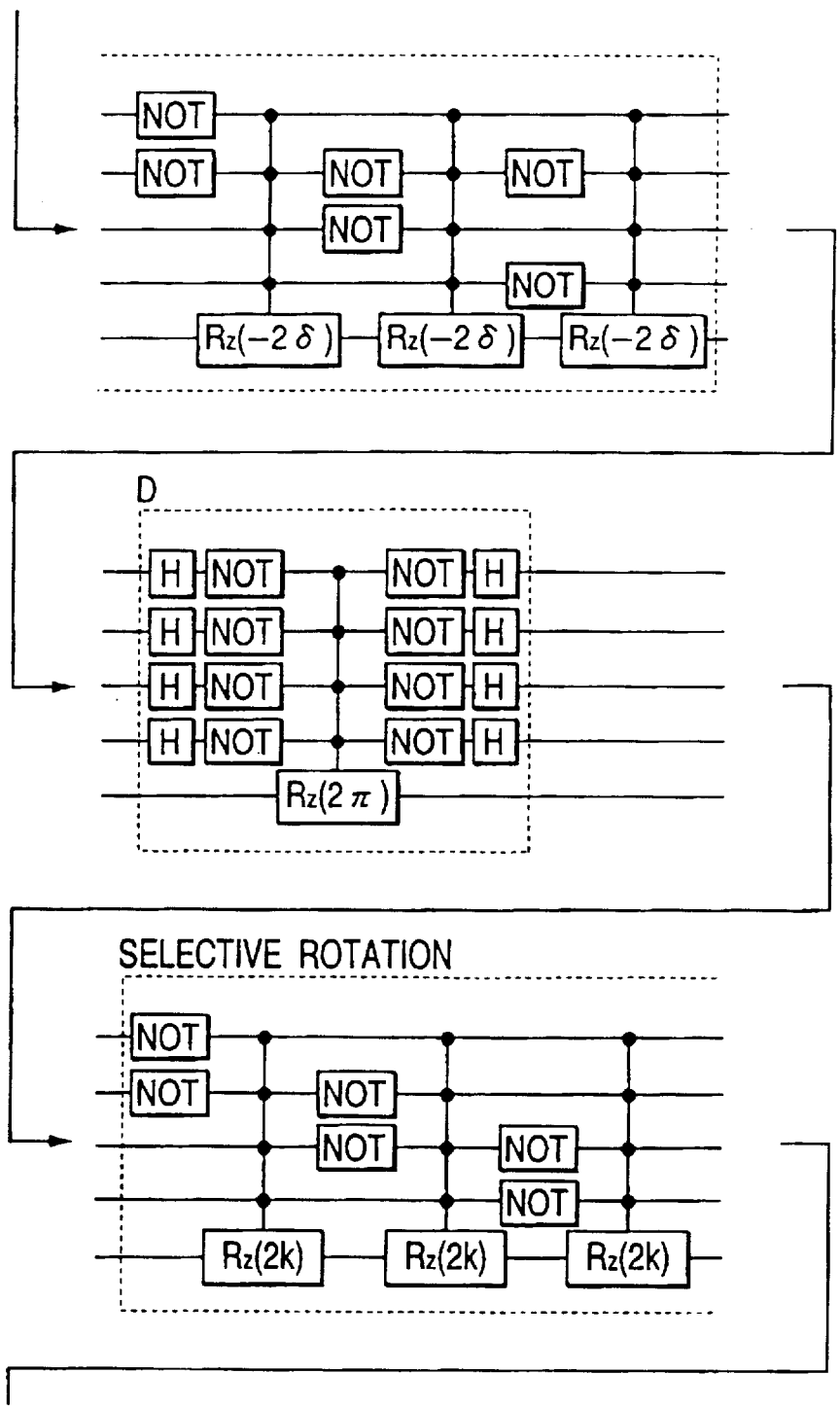
FIG. 4 is a Feynman diagram of the quantum gate network showing a case in which the "first trial method" does not use the second register for n=4.
Figure 5:
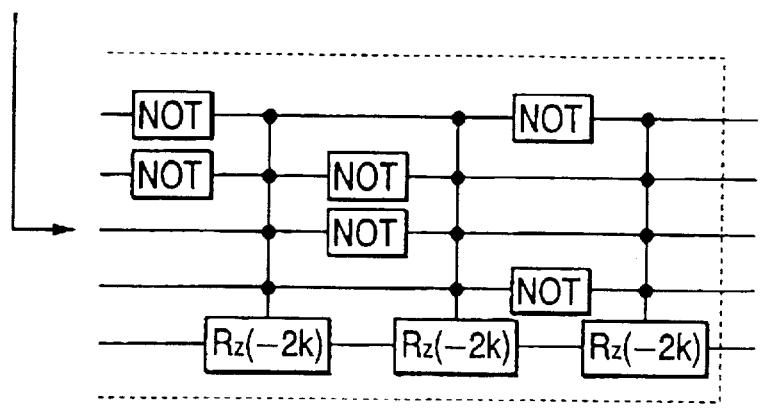
FIG. 5 is a Feynman diagram of the quantum gate network showing a case in which the "first trial method" does not use the second register for n=4.

One preferred embodiment of the present invention will be described with reference to the accompanying drawings.

Basic Ideas Common to Each Embodiment

This embodiment is described in the following order.
1. Simple method ("first trial method")
2. Specific example of the "first trial" method
3. Method for configuring a gate network for the first trial method if second registers are not used.
4. Conditions under which the $(R'\{\eta\}DR\{\eta\})$ contraction method is successful
5. $(R(\pi)D)$ repetition method
6. Simple example of the $(R(\pi)D)$ repetition method
7. Configuration of a partly entangled state using a function with an even number of collisions
8. Example of configuration of a specific quantum gate network and the evaluation of computation time (First embodiment) Quantum gate network for a function with an even number of collisions
(Second embodiment) Quantum gate network for selective phase rotations
(Third embodiment) Quantum gate network for inversion about average operations
(Fourth embodiment) Evaluation of the amount of computations during the overall process
(Fifth embodiment) Method for configuring a $\Lambda_n(R_z(\alpha))$ gate
(Sixth embodiment) Method implemented using the cold trapped ion method
(Seventh embodiment) Method applied to quantum communication These embodiments are sequentially described below.

Simple Method (First Trial Method)

First, the following method is considered as one for configuring a partly entangled state having a high symmetry. For convenience, this method is referred to as the "first trial method" herein. Although shown below, this method can configure $|\psi_n\rangle$ specified by a set of arbitrary real coefficients $\{a_k\}$ for n=2, 3 but only in special cases for $n \geq 4$.

The "first trial method," however, is a basic concept for all the embodiments, and the embodiments have been proposed as improved versions of the first trial method.

First Trial Method

1. The following initial state is prepared in an n-qubit register. $|s_1\rangle = |0 \ldots 0\rangle$.
2. Hadamard transformation is applied to each qubit of the register. The Hadamard transformation is given by the following equation.

$$H = \frac{1}{\sqrt{2}} \begin{bmatrix} 1 & 1 \\ 1 & -1 \end{bmatrix} \quad (2)$$

In the expression in Equation (2), $|0\rangle = (1, 0)$, $|1\rangle = (0, 1)$. This operation provides a flat superposition in the register as shown by the following equation.

$$|s_2\rangle = \frac{1}{\sqrt{2^n}} \sum_{k=\{0,1\}^n} |k\rangle \quad (3)$$

3. s(k) is defined to be the total number of qubits excited at $|k\rangle$. When $p=\lfloor n/2 \rfloor$, a permutation $\{\eta_0, \eta_1, \ldots \eta_{p-1}\}$ is assumed to be obtained by selecting (p) elements from $\{0, 1, \ldots p\}$ and placing them in an appropriate order (thus, $\eta_i$ is an integer that meets $0 \leq \eta_i \leq p$ for $0 \leq i \leq p$, and $\eta_i \neq \eta_j$ for $i \neq j$). The following three operations (a), (b), and (c) are sequentially performed for $i=0, 1, \ldots p-1$.

(a) An appropriate $0 \leq \phi_i < 2\pi$ is selected. If s(k) is equal to $\eta_i$, a selective rotation is executed to rotate the phase of $|k\rangle$ by $\phi_i$. If s(k) is equal to $(n-\eta_i)$, the phase of $|k\rangle$ is rotated by $(-\phi_i)$.

(b) Grover's inversion about average operation D is performed on the register (see L. K. Grover, "A fast quantum mechanical algorithm for database search," LANL quantum physics archive quant-ph/9605043 and L. K. Grover, "Quantum Mechanics Helps in Searching for a Needle in a Haystack," Phys. Rev. Lett. 79, 325 (1997))

(c) If s(k) is equal to $\eta_i$, the phase of $|k\rangle$ is rotated by $\theta_i$. If s(k) is equal to $(n-\eta_i)$, a selective rotation is executed to rotate the phase of $|k\rangle$ by $(-\theta_i)$. A phase rotation parameter $\theta_i$ is selected so as to offset the phase of a basic vector to make the coefficient a real number.

In the above description, the permutation $\{\eta_0, \eta_1, \ldots, \eta_{p-1}\}$ and phase rotation parameter $\{\theta_0, \theta_1, \ldots, \theta_{p-1}\}$ depend on the set of coefficients $\{a_k\}$ in the Equation (1).

If (n) is an even number and $\eta = n - \eta = n/2$, the number of basic vectors with which $s(k) = \eta$ is established is even. Thus, in the above step 3(a), the phase is rotated by $\theta$ for half of all the basic vectors with which $s(k) = \eta$ is established, whereas the phase is rotated by $(-\theta)$ for the remaining half of the basic vectors. Similar operations are performed in step 3(c).

To execute the selective rotation efficiently, two registers are provided. A first register consists of (n) qubits and a second register consists of $\lceil \log_2(n+1) \rceil$ qubits. $\lceil \log_2(n+1) \rceil$ represents a minimum integer larger than or equal to $\log_2(n+1)$. The Hadamard transformation is applied to each qubit of the first register to obtain the flat superposition, and then the value of s(k) is written to the second register as shown in the following expression.

$$\frac{1}{\sqrt{2^n}} \sum_{k=\{0,1\}^n} |k\rangle \otimes |0\rangle \rightarrow \frac{1}{\sqrt{2^n}} \sum_{k=\{0,1\}^n} |k\rangle \otimes |s(k)\rangle. \quad (4)$$

When the selective rotation is executed, the number of quantum gates used can be saved by setting in the second register a control section for the quantum gates. For example, consider a case in which n=4 and s(k)=1. The rotation of the phase of the second register in the state of $|1\rangle$ is equal to the rotation of the phases of eight basic vectors in the first vector. The second register must be initialized to $|0 \ldots 0\rangle$ before the inversion about average operation D is performed and before a final state is obtained.

To confirm the operation of the method described above, the status $|s_3\rangle$ after step 3(a) (i=0) is expressed as follows.

$$|s_3\rangle = R\{\eta\}|s_2\rangle \tag{5}$$

$$= \frac{1}{\sqrt{2^n}}[\underbrace{\exp(i\phi), \ldots, \exp(-i\phi), \ldots}_{h}, 1, \ldots, \underbrace{1}_{2^n-2h}]$$

where (h) is the number of basic vectors for which s(k) is equal to η is h.

R{η} represents the selective rotation used in step 3(a). In this case, i=0 that is a subscript has been omitted. In Equation (5), $\{|k\rangle | k \in \{0,1\}^n\}$ is used as an orthonormal basis. As in the expression in Equation (5), the embodiments often describe vertical vectors as horizontal vectors. In addition, the embodiments represent (h) as the number of basic vectors for which s(k) is equal to η. Thus, (h) components $\exp(i\phi)$ and (h) components $\exp(-i\phi)$ exist in $|s_3\rangle$.

In the expression in (5), the order of the basic vectors $\{|0 \ldots 00\rangle, |0 \ldots 01\rangle \ldots, |1 \ldots 11\rangle\}$ has been changed so that the components $\exp(i\phi)$ and $\exp(-i\phi)$ are collected at the left end of $|s_3\rangle$. Such a change in the order of the basic vectors does not change the matrix expression of the inversion about average operation D. A $2^n \times 2^n$ matrix expression of D is given as shown below.

$$\begin{cases} D_{ij} = 2^{-n+1} & \text{if } i \neq j \\ D_{ii} = -1 + 2^{-n+1} \end{cases} \tag{6}$$

Applying D to $|s_3\rangle$ results in the following state:

$$|s_4\rangle = D|s_3\rangle = [\alpha, \ldots, \alpha', \ldots, \beta, \ldots], \tag{7}$$

where α and β meet the following conditions.

$$\begin{cases} 2^{(3n/2)-1}\alpha = 2h\cos\phi + (2^n - 2h) - 2^{n-1}e^{i\phi}, \\ 2^{(3n/2)-1}\beta = 2h\cos\phi + (2^n - 2h) - 2^{n-1} \end{cases} \tag{8}$$

To offset the phase, θ is defined as follows:

$$e^{i\theta} = \frac{\alpha^*}{|\alpha|} \tag{9}$$

Next, selective rotation R'{η} acts upon is $|s_4\rangle$.

$$|s_5\rangle = R'\{\eta\}|s_4\rangle = [e^{i\theta}\alpha, \ldots, e^{-i\theta}\alpha^*, \ldots, \beta, \ldots] \tag{10}$$

$$= [\underbrace{|\alpha|, \ldots}_{2h}, \beta, \ldots],$$

where the number of components $|\alpha|$ is 2h. To make the coefficients of 2h basic vectors negative, the phases of the 2h basic vectors may be rotated selectively by π.

For example, for n=2, $|\psi_2\rangle$ is given as follows:

$$|\psi\rangle_1 = a_0(|00\rangle + |11\rangle) + a_1(|01\rangle + |10\rangle), \tag{11}$$

where the following relations are established.

$$\begin{cases} (i) & 1/2 \leq a_0 \leq 1/\sqrt{2}, \quad 0 \leq |a_1| \leq 1/2 \\ (ii) & 0 \leq |a_0| \leq 1/2, \quad 1/2 \leq a_1 \leq 1/\sqrt{2}. \end{cases} \tag{12}$$

By executing the above method using the operation for rotating the phase by (±φ) for $|00\rangle$ and $|11\rangle$ in which 2-qubits are flatly superposed on one another, $|\psi_2\rangle$ is obtained as shown by the following equation.

$$a_0 = \frac{\sqrt{1 + \sin^2\phi}}{2}, \quad a_1 = \frac{\cos\phi}{2} \tag{13}$$

This is included within the range of 12(i). φ must be determined from (13) using conventional computations before quantum operations are performed.

The "first trial method" enables the configuration of $|\psi_2\rangle$ and $|\psi_3\rangle$ that are provided by arbitrary real coefficients. For n≥4, however, $|\psi_n\rangle$ that cannot be configured by this method exists depending on the set of coefficients $\{a_k\}$. For example, the following state cannot be configured by this method.

$$|\psi_4\rangle = \sqrt{\frac{3}{7}}|0\rangle_s + \frac{1}{7\sqrt{2}}|1\rangle_s + \left(\frac{1}{1\sqrt{2}}|2\rangle\right)_s.$$

The "first trial method" corresponds to continuous execution of the (R'{η}DR{η}) contraction method, which is described below. The (R'{η}DR{η}) contraction method is not always successful, but there are sufficient conditions for success, which will also be described below.

In addition, as described for Equation (13), the "first trial method" must use conventional computations to determine the phase rotation parameter $\phi_n$ before unitary gates are operated. The needs for conventional computations prior to the configuration of a quantum gate network are common to all embodiments.

According to the "first trial method," (p+1) basic vectors are available for selective rotations for $p=\lfloor n/2 \rfloor$. Thus, there are (p+1)! permutations to which (R'{η}DR{η}) is applied. If, however, $|\psi_r\rangle$ can be configured, (R'{η}DR{η}) is applied to only some of these permutations. Furthermore, certain $|\psi_n\rangle$ cannot be configured by this method.

In addition, trials and errors must be carried out (p+1)! times using conventional computations before the phase rotation parameter can be determined. Thus, the burden of computations becomes heavier as (n) increases.

Thus, as a method for solving these problems, a method will be described below that uses sufficient conditions for the success of the (R'{η}DR{η}) contraction method and a (R(π)D) repetition method according to the embodiments.

Specific Example of the "First Trial Method"

Before explaining the sufficient conditions for the success of the (R'{η}DR{η}) contraction method and the (R(π)D) repetition method, descriptions are given of changes in qubit for n=2, 3, 4 according to the "first trial method" and of a quantum gate network configuration in a case where the second register is not used.

(n) and $\{a_0, a_1, \ldots, a_p\}$ are assumed to be given beforehand, where $p=\lfloor n/2 \rfloor$. A quantum gate network is considered that configures the partly entangled state with a high symmetry $|\psi_n\rangle$ specified by these constants and expressed by Equation (1).

To examine specific changes in qubit state, a case of n=2 is considered as a first simple example. In the meantime, the following relations are assumed in Equation (11).

$$½ \leq a_0 \leq 1/\sqrt{2}, \quad -½ \leq a_1 \leq ½$$

First, as an initial state, $|00\rangle$ is provided for a first and a second qubits, and H (Hadamard transformation) is individually applied to each qubit. This operation transforms the qubits to the following state.

$$|00\rangle \to \frac{1}{2}(|00\rangle + |01\rangle + |10\rangle + |11\rangle)$$

A selective rotation is executed in such a way that $|00\rangle$ and $|11\rangle$ are each multiplied by phase factor $\exp(i\phi)$. The resulting state of the first and second qubits is denoted as $|\psi\rangle$.

$$|\psi\rangle = \frac{1}{2}(e^{i\phi}|00\rangle + |01\rangle + |10\rangle + e^{-i\phi}|11\rangle)$$

Next, an inversion about average operation is performed. Since n=2, D is given in the form of a matrix of 4×4, using Equation (6).

$$D = \frac{1}{2}\begin{vmatrix} -1 & 1 & 1 & 1 \\ 1 & -1 & 1 & 1 \\ 1 & 1 & -1 & 1 \\ 1 & 1 & 1 & -1 \end{vmatrix}\begin{matrix}|00\rangle \\ |01\rangle \\ |10\rangle \\ |11\rangle\end{matrix}$$

$$\langle 00| \ \langle 01| \ \langle 10| \ \langle 11|$$

The application of D to $|\psi\rangle$ leads to the following transformation.

$$|\psi\rangle = \frac{1}{2}\begin{bmatrix}\exp(i\phi)\\1\\1\\\exp(-i\phi)\end{bmatrix} \to D|\psi\rangle = \frac{1}{2}\begin{bmatrix}1-i\sin\phi\\\cos\phi\\\cos\phi\\1+i\sin\phi\end{bmatrix}$$

Next, $|00\rangle$ and $|11\rangle$ are again multiplied by phase factors $\exp(i\theta)$ and $\exp(-i\theta)$, respectively. In this case, $\theta$ meets the following relation.

$$e^{i\theta} = \frac{1+i\sin\phi}{|1+i\sin\phi|}$$

Such a selective rotation causes the two qubits to enter the following state.

$$\frac{\sqrt{1+\sin^2\phi}}{2}(|00\rangle + |11\rangle) + \frac{\cos\phi}{2}(|01\rangle + |10\rangle)$$

Thus, by selecting beforehand $\phi$ to meet the following equation, $$a_0 = \frac{\sqrt{1+\sin^2\phi}}{2}, \left(a_1 = \frac{\cos\phi}{2}\right)$$

the target partly entangled state $|\psi_2\rangle$ is obtained.

The following point is noted. Since the physical quantity of $|\psi_2\rangle$ does not vary despite a rotation of the phase of the entire $|\psi_2\rangle$, the ranges of the values of $a_0$ and $a_1$ are as shown below.

(i) $\frac{1}{2} \leq a_0 \leq 1/\sqrt{2}$, $0 \leq |a_1| \leq \frac{1}{2}$ (ii) $0 \leq |a_0| \leq \frac{1}{2}$, $\frac{1}{2} \leq a_1 \leq 1/\sqrt{2}$ The above specific example provides a method for configuring $|\psi_2\rangle$ that meets the condition in (i). To configure $|\psi_2\rangle$ that meets the condition in (ii), the selective rotation may be applied to $|01\rangle$ and $|10\rangle$ instead of $|00\rangle$ and $|11\rangle$. Thus, for n=2, an arbitrary $|\psi_2\rangle$ can be configured using the "first trial method."

Next, a case of n=3 is considered.

$$|\psi_3\rangle = a_0(|000\rangle + |111\rangle) + a_1(|001\rangle + |010\rangle + |100\rangle + |110\rangle + |101\rangle + |011\rangle) \quad (14)$$

In this equation, $a_0^2 + 3a_1^2 = \frac{1}{2}$. In the meantime, the following relations are assumed.

$$\tfrac{1}{2}\sqrt{2} \leq a_0 \leq 1/\sqrt{2}, \ 0 \leq a_1 \leq \tfrac{1}{2}\sqrt{2}$$

First, as an initial state, $|000\rangle$ is provided for a first, a second, and a third qubits, and H (Hadamard transformation) is applied to each qubit independently.

$$|000\rangle \to$$

$$\frac{1}{2\sqrt{2}}(|000\rangle + |001\rangle + |010\rangle + |011\rangle + |100\rangle + |101\rangle + |110\rangle + |111\rangle)$$

A selective rotation is executed in such a way that $|000\rangle$ and $|111\rangle$ are multiplied by phase factor $\exp(i\phi)$ and $\exp(-i\phi)$, respectively. Then, the following state $|\psi\rangle$ is obtained.

$$|\psi\rangle = \frac{1}{2\sqrt{2}}$$

$$(e^{i\phi}|000\rangle + |001\rangle + |010\rangle + |011\rangle + |100\rangle + |101\rangle + |110\rangle + e^{-i\phi}|111\rangle)$$

Next, the inversion about average operation D is performed. If n=3 in Equation (6), the following matrix expression is given.

$$D = \frac{1}{4}\begin{vmatrix} -3 & 1 & 1 & 1 & 1 & 1 & 1 & 1 \\ 1 & -3 & 1 & 1 & 1 & 1 & 1 & 1 \\ 1 & 1 & -3 & 1 & 1 & 1 & 1 & 1 \\ 1 & 1 & 1 & -3 & 1 & 1 & 1 & 1 \\ 1 & 1 & 1 & 1 & -3 & 1 & 1 & 1 \\ 1 & 1 & 1 & 1 & 1 & -3 & 1 & 1 \\ 1 & 1 & 1 & 1 & 1 & 1 & -3 & 1 \\ 1 & 1 & 1 & 1 & 1 & 1 & 1 & -3 \end{vmatrix}\begin{matrix}|000\rangle\\|001\rangle\\|010\rangle\\|011\rangle\\|100\rangle\\|101\rangle\\|110\rangle\\|111\rangle\end{matrix}$$

$$\langle 000| \ \langle 001| \ \langle 010| \ \langle 011| \ \langle 100| \ \langle 101| \ \langle 110| \ \langle 111|$$

The application of D to $|\psi\rangle$ leads to the following transformation.

$$D|\psi\rangle = \frac{1}{8\sqrt{2}}\begin{bmatrix}6 - 3e^{i\phi} + e^{-i\phi}\\2(1+\cos\phi)\\2(1+\cos\phi)\\2(1+\cos\phi)\\2(1+\cos\phi)\\2(1+\cos\phi)\\2(1+\cos\phi)\\6 - 3e^{i\phi} + e^{-i\phi}\end{bmatrix}$$

Next, $|000\rangle$ and $|111\rangle$ are again multiplied by phase factors $\exp(i\theta)$ and $\exp(-i\theta)$. In this case, $\theta$ meets the following relation.

$$e^{i\theta} = \frac{6 - 3e^{-i\phi} + e^{i\phi}}{|6 - 3e^{i\phi} + e^{-i\phi}|} \qquad (5)$$

Such a selective rotation causes the two qubits to enter the following state.

$$\frac{\sqrt{23 - 12\cos\phi - 3\cos 2\phi}}{8}(|100\rangle + |11\rangle) + \frac{1 + \cos\phi}{4\sqrt{2}}(|01\rangle + |10\rangle) \qquad (15)$$

Thus, by selecting beforehand $\phi$ to meet the following equation, $$a_0 = \frac{\sqrt{23 - 12\cos\phi - 3\cos 2\phi}}{8}, \left(a_1 = \frac{1 + \cos\phi}{4\sqrt{2}}\right)$$

the target partly entangled state $|\psi_3\rangle$ is obtained.

The following point is noted. Based on Equation (15), $a_0$ and $a_1$ in Equation (14) each assume the following four values.

(i) $\tfrac{1}{2}\sqrt{2} \leq a_0 \leq 1/\sqrt{2}$, $0 \leq a_1 \leq \tfrac{1}{2}\sqrt{2}$
(ii) $\tfrac{1}{2}\sqrt{2} \leq a_0 \leq 1/\sqrt{2}$, $-\tfrac{1}{2}\sqrt{2} \leq a_1 \leq 0$
(iii) $0 \leq a_0 \leq \tfrac{1}{2}\sqrt{2}$, $\tfrac{1}{2}\sqrt{2} \leq a_1 \leq 1/\sqrt{6}$
(iv) $-\tfrac{1}{2}\sqrt{2} \leq a_0 \leq 0$, $\tfrac{1}{2}\sqrt{2} \leq a_1 \leq 1/\sqrt{6}$ The above specific example provides a method for configuring $|\psi_3\rangle$ that meets the condition in (i). To configure $\psi_3\rangle$ that meets the condition in (ii), $|000\rangle$ and $|111\rangle$ may be multiplied by $-\exp(i\theta)$ and $-\exp(-\theta)$ in the second selective rotation, respectively. In addition, by subjecting $|001\rangle$, $|010\rangle$, $|100\rangle$, as well as $|110\rangle$, $|101\rangle$, and $|011\rangle$ to a selective rotation, $$\frac{1}{2\sqrt{2}}[|000\rangle + e^{i\phi}\{|001\rangle + |010\rangle + |100\rangle\} + e^{-i\phi}\{|110\rangle |101\rangle + |011\rangle\} + |111\rangle]$$

then the inversion about average operation D, and $$\frac{1}{8\sqrt{2}}[2(3\cos\phi - 1)(|000\rangle + |111\rangle) + (2 - e^{i\phi} + 3e^{-i\phi})(|001\rangle |010\rangle + |100\rangle) + (2 - e^{-i\phi} + 3e^{i\phi})(|110\rangle + |101\rangle + |011\rangle)]$$

then a selective rotation again, the following relation is obtained.

$$\frac{3\cos\phi - 1}{4\sqrt{2}}(|000\rangle + |111\rangle) +$$

$$\frac{\sqrt{7 + 4\cos\phi - 3\cos 2\phi}}{8}(|001\rangle + |010\rangle + |100\rangle + |110\rangle + |101\rangle + |011\rangle)$$

This result indicates that the elementary computations have been used to configure $|\psi_3\rangle$ that meets the condition in (iii) within the range of $0 \leq \phi \leq \zeta$ for $\cos\zeta = \tfrac{1}{3}$. $|\psi_3\rangle$ that meets the condition in (iv) can be similarly configured. Consequently, the "first trial method" can configure an arbitrary $|\psi_3\rangle$.

Next, a case of $n=4$ is considered.

$$|\psi\rangle = a_0(|0000\rangle + |1111\rangle) + a_1(|0001\rangle + |0010\rangle + |1000\rangle + |1110\rangle + |1101\rangle + |1011\rangle + |0111\rangle) + a_2(|0011\rangle + |0101\rangle + |0110\rangle + |1001\rangle + |1100\rangle)$$

In this equation, $a_0^2 + 4a_1^2 + 3a_2^2 = \tfrac{1}{2}$.

First, as an initial state, $|0000\rangle$ is provided for a first, a second, a third, and a fourth qubits, and H (Hadamard transformation) is applied to each qubit independently.

$$|0000\rangle \to \frac{1}{4}\sum_{i=0}^{15}|i\rangle$$

In the above expression, i is a binary expression of i. By selectively multiplying $|0000\rangle$ and $|1111\rangle$ by phase factor $\exp(i\phi)$ and $\exp(-i\phi)$, respectively, the following state $|\psi\rangle$ is obtained.

$$|\psi\rangle \frac{1}{4}(e^{i\phi}|\underline{0}\rangle |\underline{1}\rangle + \ldots + |\underline{14}\rangle + e^{-i\phi}|\underline{15}\rangle)$$

Next, the inversion about average operation D is performed. If $n=4$, Equation (6) can be written as follows using a matrix expression.

$$D = \frac{1}{4}\begin{bmatrix} -7 & 1 & 1 & \cdots & 1 \\ 1 & -7 & 1 & \cdots & 1 \\ & \cdots & \cdots & \cdots & \\ & \cdots & \cdots & \cdots & \\ 1 & & \cdots & & -7 \end{bmatrix}$$

The application of D causes the qubits to enter the following state.

$$D|\psi\rangle = \frac{1}{32}\begin{bmatrix} 14 - 7e^{i\phi} + e^{-i\phi} \\ 2(3 + \cos\phi) \\ 2(3 + \cos\phi) \\ \cdots \\ 14 - 7e^{-i\phi} + e^{i\phi} \end{bmatrix}$$

Next, $|0000\rangle$ and $|1111\rangle$ are again multiplied by phase factors $\exp(i\theta)$ and $\exp(-i\theta)$. In this case, $\theta$ meets the following equation.

$$e^{i\theta} = \frac{14 - 7e^{-i\phi} + e^{i\phi}}{|14 - 7e^{i\phi} + e^{-i\phi}|}$$

Such a selective rotation causes the two qubits to enter the following state.

$$\frac{r_1(\phi)}{32}(|0000\rangle + |1111\rangle) + \frac{r_2(\phi)}{32}(|0001\rangle + \cdots + |1110\rangle)$$

In this case, the following equations are established.

$$r_1(\phi) = |14 - 7e^{i\phi} + e^{-i\phi}|, \quad r_2(\phi) = 2(3 + \cos\phi)$$

Furthermore, $|0011\rangle$, $|0101\rangle$, and $|0110\rangle$ are multiplied by phase factor $\exp(i\delta)$ and $|1001\rangle$, $|1010\rangle$, and $|1100\rangle$ are multiplied by phase factor $\exp(-i\delta)$. Subsequently, another application of D causes the qubits to enter the following state.

$$\frac{1}{32}\begin{bmatrix} r_1(\phi) \\ r_2(\phi) \\ r_2(\phi) \\ r_2(\phi)\exp(i\delta) \\ r_2(\phi) \\ r_2(\phi)\exp(i\delta) \\ r_2(\phi)\exp(i\delta) \\ r_2(\phi) \\ r_2(\phi) \\ r_2(\phi)\exp(-i\delta) \\ r_2(\phi)\exp(-i\delta) \\ r_2(\phi) \\ r_2(\phi)\exp(-i\delta) \\ r_2(\phi) \\ r_2(\phi) \\ r_1(\phi) \end{bmatrix} \rightarrow$$

$$\frac{1}{256}\begin{bmatrix} -6r_1(\phi) + 2r_2(\phi)(4 + 3\cos\delta) & |0000\rangle \\ 2r_1(\phi) + 6r_2(\phi)\cos\delta & |0001\rangle \\ 2r_1(\phi) + 6r_2(\phi)\cos\delta & |0010\rangle \\ 2r_1(\phi) + r_2(\phi)(8 - 5\exp(i\delta) + 3\exp(-i\delta)) & |0011\rangle \\ 2r_1(\phi) + 6r_2(\phi)\cos\delta & |0100\rangle \\ 2r_1(\phi) + r_2(\phi)(8 - 5\exp(i\delta) + 3\exp(-i\delta)) & |0101\rangle \\ 2r_1(\phi) + r_2(\phi)(8 - 5\exp(i\delta) + 3\exp(-i\delta)) & |0110\rangle \\ 2r_1(\phi) + 6r_2(\phi)\cos\delta & |0111\rangle \\ 2r_1(\phi) + 6r_2(\phi)\cos\delta & |1000\rangle \\ 2r_1(\phi) + r_2(\phi)(8 - 5\exp(-i\delta) + 3\exp(i\delta)) & |1001\rangle \\ 2r_1(\phi) + r_2(\phi)(8 - 5\exp(-i\delta) + 3\exp(i\delta)) & |1010\rangle \\ 2r_1(\phi) + 6r_2(\phi)\cos\delta & |1011\rangle \\ 2r_1(\phi) + r_2(\phi)(8 - 5\exp(-i\delta) + 3\exp(i\delta)) & |1100\rangle \\ 2r_1(\phi) + 6r_2(\phi)\cos\delta & |1101\rangle \\ 2r_1(\phi) + 6r_2(\phi)\cos\delta & |1110\rangle \\ -6r_1(\phi) + 2r_2(\phi)(4 + 3\cos\delta) & |1111\rangle \end{bmatrix}$$

$|0011\rangle$, $|0101\rangle$, and $|0110\rangle$ are multiplied by phase factor $\exp(i\kappa)$ and $|1001\rangle$, $|1010\rangle$, and $|1100\rangle$ are multiplied by phase factor $\exp(-i\kappa)$. In this case, $\kappa$ meets the following relation.

$$e^{i\kappa} = \frac{2r_1(\phi) + r_2(\phi)(2 - 5\exp(-i\delta) + 3\exp(-i\delta))}{|2r_1(\phi) + r_2(\phi)(8 - 5\exp(i\delta) + 3\exp(-i\delta))|}$$

Such a selective rotation causes the qubits to enter the following state.

$$\frac{1}{256}\{s_1(\phi,\delta)(|0000\rangle + |1111\rangle) +$$

$$s_2(\phi,\delta)(|0001\rangle + \cdots + |0111\rangle) + s_3(\phi,\delta)(|0011\rangle + \cdots + |1100\rangle)\}$$

In this case, the following equations are established.

$s_1(\phi, \delta) = -6r_1(\phi) + 2r_2(\phi) (4+3\cos \delta)$ $s_2(\phi, \delta) = 2r_1(\phi) + 6r_2(\phi)\cos \delta$ $s_3(\phi, \delta) = |2r_1(\phi) + r_2(\phi) (8-5 \exp (i\delta) + 3 \exp (-i\delta))|$ By selecting appropriate parameters as $\phi$ and $\delta$, the particular partly entangled state $|\psi_4\rangle$ is obtained. Appropriate selection of a term for the selective rotation enables various combinations of possible values of coefficients $\{a_0, a_1, a_2\}$ to be accommodated. As described above, however, the "first trial method" cannot always configure an arbitrary $|\psi_n\rangle$ for $n \geq 4$.

Method for Configuring a Gate Network Using the "First Trial Method" Without the Second Register Next, FIGS. 1, 2, and 3 to 5 show a method for using of the "first trial method" to configure a network of quantum gates without the second register, for n=2, 3, and 4.

It is determined how the total number of basic quantum gates required for a network of quantum gates varies with an increase in (n) if the "first trial method" does not use the second register. For simplification, (n) is assumed to be an odd number, so it can be expressed as n=2p+1. In this case, Equation (1) is expressed as follows:

$$|\psi_{2p+1}\rangle = \sum_{k=0}^{p} a_k |k\rangle_s$$

where $|k\rangle$ denotes a superposition of the states of $_{2p+1}C_k$ terms in the (2p+1) qubits which contain k $|1\rangle$ or (2p+1-k)$|1\rangle$, wherein the superposition is established using an equal weight. In addition the selective rotation is executed in the particular order of $|k\rangle$ (k=1, ..., p).

Figure 6:
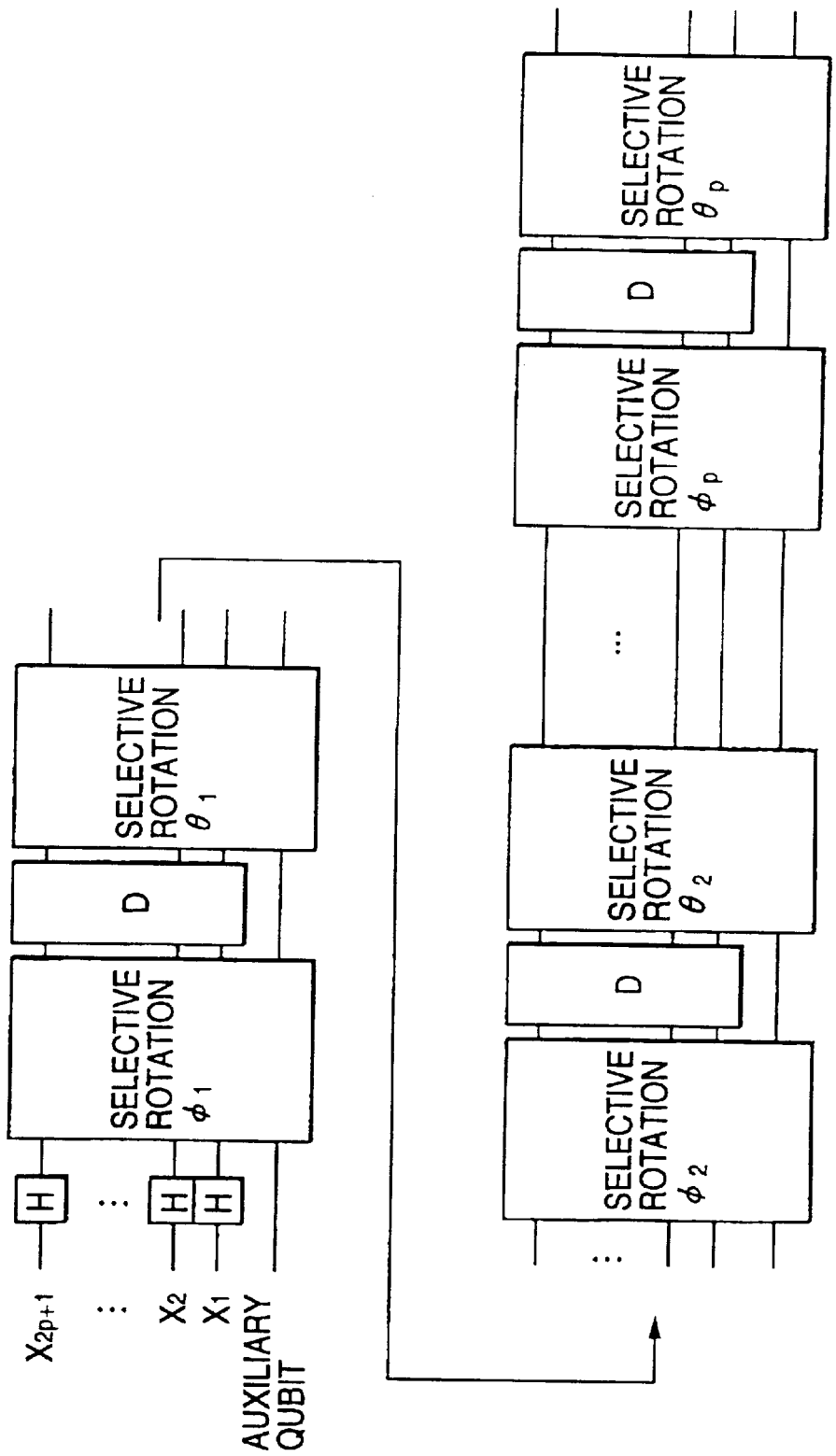
FIG. 6 shows the overall flow of the "first trial method" processing for a general (n)

FIG. 6 shows the flow of the overall process. $X_1, \ldots, X_{2p+1}$ represent the (2p+1) qubits of the first register. A series of operations including a selective rotation, an inversion about average operation, and a selective rotation are continuously performed (q) times. During the selective rotation of $\phi_k$, the $_{2p+1}C_k$ terms containing k $|1\rangle$ is multiplied by phase factor $\exp(i\phi_k)$, while the remaining $_{2p+1}C_k$ terms containing (2p+1-k) $|1\rangle$ is multiplied by phase factor $\exp(-i\phi_k)$.

Figure 7:
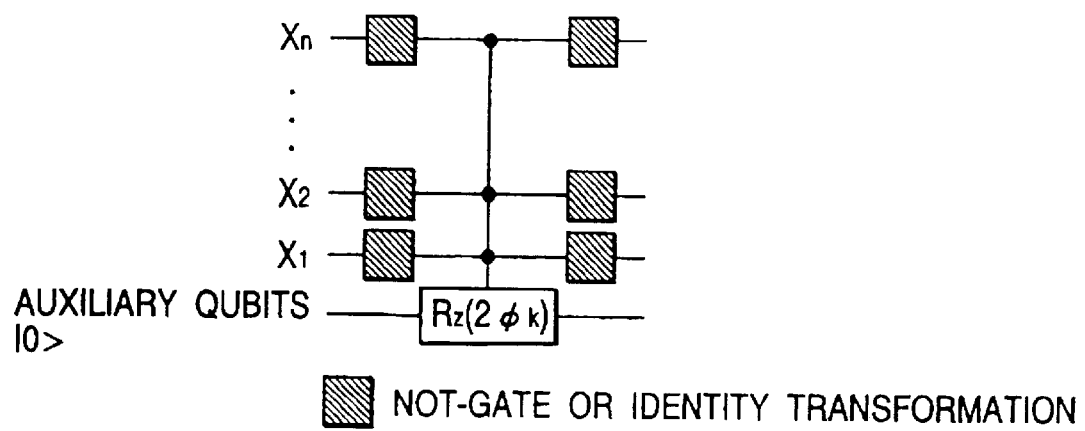
FIG. 7 is a Feynman diagram of quantum gates that selectively rotate a particular state of a first register.

FIG. 7 shows quantum gates that selectively rotate a single particular state. $X_1, \ldots, X_n$ denote the n qubits of the first register. In addition, the shaded rectangles in the figure each contain a NOT-gate $\sigma_x$ or an identity transformation I. Whether the rectangle contains the NOT-gate or the identity transformation depends on k. Thus, clearly, the selective rotation requires one $\Lambda_n(R_2(2\phi_k))$ at minimum.

$\Lambda n(R_2(2\phi_k))$ is defined in the (second embodiment) of [Example of a configuration of a specific quantum gate network and evaluations of the computation time] described below. Although shown in the subsequent (fifth embodiment) of [Example of a configuration of a specific quantum gate network and evaluations of the computation time], 8(2n-7) basic gates have been confirmed to be required to configure $\Lambda_n(R_2(2\phi_k))$. Accordingly, at least 8(2n-7) basic gates are required for the overall selective rotation.

$2_{2p+1}C_k$ states are selected for phase factors $\exp(i\phi_k)$ and $\exp(-i\phi_k)$. Similar operations performed on phase factors $\exp(i\theta_k)$ and $\exp(-i\theta_k)$. Since the selective rotation is carried out from k=1 to k=p, at least the following amount of computations is required in total.

$$4 \times 8(2n-7) \sum_{k=1}^{p} {}_{2p+1}C_k = 32(2n-7)(2^{2p}-1)$$

$$= 32(2n-7)(2^{n-1}-1)$$

As described above, if the "first trial method" does not use the second register, the amount of computations increases in the order of $O(2^n)$ with increasing n. In fact, a second register can be provided to limit the total number of basic gates to the order of $O(2^n/2)$, as described below.

Conditions for the Success of the $(R'\{\eta\}DR\{\eta\})$ Contraction Method

The phase rotation parameter may be determined as follows using conventional computations. The "first trial method" is a combination of the selective rotation and the inversion about average operation. These are unitary transformations and $|\psi_n\rangle$ can be assumed to be inverse to an operation for transformation to the flat superposition shown below.

$$\frac{1}{\sqrt{2^n}} \sum_{k=\{0,1\}^n} |k\rangle$$

Fortunately, the inverse transformation of the selective rotation is also a selective rotation, while the inverse transformation of the inverse about average operation D is also an inverse about average operation D.

Thus, an operation for applying transformation (R'DR) to basic vectors having factors $a_i$ and $a_j$ to make new factors after transformation the same is called a "(R'DR) contraction operation." The lemma described next provides a sufficient condition for the (R'DR) contraction operation. Then, $$p = \lfloor n/2 \rfloor$$

is assumed and in the meantime, $a_k > 0$ is assumed for k=0, 1, ..., p.

Lemma 0.1 [Sufficient condition for a contraction operation]
$|\psi\rangle$ is assumed to be given as follows:

$$|\Psi\rangle = [\underbrace{a_0, \ldots,}_{2h} \underbrace{a_1, \ldots,}_{2h} a_{2(h+m)}, \ldots a_N],$$

where $N=2^{n-1}$ and $0 \le a_0 \le a_1$. The number of components $a_0$ is assumed to be 2h while the number of components $a_1$ is assumed to be 2m. $h \ge 1$, $m \ge 1$, and $h+m \le 2^{n-1}$ are also assumed. The sum of all the coefficients of $|\psi\rangle$ is represented by S.

$$S = 2ha_0 + 2ma_1 + \sum_{k=2(h+m)}^{2^n-1} a_k$$

If the following condition $$S - 2^{n-2}(a_0 + a_1) \ge 0$$

is met, a (R'DR) contraction method including a selective rotation of 2m basic vectors can be used to constantly make the same the coefficients of 2(h+m) basic vectors, which have been $a_0$ or $a_1$.

(Proof) When a selective rotation of a rotating angle $\theta$ ($0 \le \theta < 2\pi$) is applied to 2m basic vectors having factor $a_1$, the following state is obtained.

$$R(\theta)|\Psi\rangle = [\underbrace{a_0, \ldots,}_{2h} \underbrace{e^{-i\theta}a_1, \ldots,}_{2h} \underbrace{e^{-i\theta}a_1, \ldots,}_{2h} a_{2(h+m)}, \ldots, a_N]$$

However, $N=2^n-1$, thus $R'(\theta)DR(\theta)|\psi\rangle$ can be written as follows.

$$R'(\theta)DR(\theta)|\psi\rangle = [A_0, \ldots, A_1, \ldots, A_{2(h+c)}, \ldots, A_{2^n-1}],$$

In this case, the following equations are assumed.

$$\begin{cases} 2^{n-1}A_0 = (2h - 2^{n-1})a_0 + 2ma_1\cos\theta + C \\ 2^{n-1}A_1 = |2ha_0 + (m - 2^{n-1})a_1 e^{i\theta} + ma_1 e^{-i\theta} + C| \\ 2^{n-1}A_j = 2ha_0 + 2ma_1\cos\theta - 2^{n-1}a_j + C \\ \quad \text{for } j = 2(h+m), \ldots, 2^n - 1 \end{cases} \quad (16)$$

The following equation is also assumed.

$$C = \sum_{k=2(h+m)}^{2^n-1} a_k$$

To make $A_0^2$ equal to $A_1^2$, the following function $f(\theta)$ is defined.

$$f(\theta) = 2^{n-2}(A_0^2 - A_1^2) \quad (17)$$
$$= (2ha_0 + 2ma_1\cos\theta + C)(a_1\cos\theta - a_0) - 2^{n-2}(a_1^2 - a_0^2).$$

If $f(\theta)=0$ is met, $A_0^2$ is equal to $A_1^2$. Then, $f(0)$ and $f(\pi/2)$ are evaluated as shown below.

$$\begin{cases} f(0) = (a_1 - a_0)[S - 2^{n-2}(a_0 + a_1)] \\ f(\pi/2) = -a_0(2ha_0 + C) - 2^{n-2}(a_1^2 - a_0^2) < 0 \end{cases} \quad (18)$$

Thus, if $S - 2^{n-2}(a_0+a_1) \ge 0$ is met, $0 \le \theta < (\pi/2)$ exists that meets $A_0^2 = A_1^2$. If $A_0$ and $A_1$ have different signs, a selective $\pi$ rotation may be carried out.

To determine the phase rotation parameter, the following procedure is used. A given state $|\psi_n\rangle$ is expressed using (1). In this case, $a_k \ge 0$ for $0 \le k \le p$.

$a_{min}$ is the minimum coefficient of $\{a_k\}$, and $a_{min+1}$ is the second smallest coefficient. Thus, $0 \le a_{min} < a_{min+1} < a_j$, but $a_j$ is an arbitrary coefficient of $|\psi_n\rangle$ other than $a_{min}$ and $a_{min+1}$.

The number of different coefficients in $\{a_k\}$ is (P+1), so the time required to find $a_{min}$ and $a_{min+1}$ is only O(n) steps. S is the sum of all the coefficients of $|\psi_n\rangle$.

1. If $S < 2^{n-2}(a_{min}+a_{min+1})$ is established, $S < 2^{n-2}(a_i+a_j)$ is established for all (i) and (j). In this case, the (R'DR) contraction method cannot be carried out. Thus, the $(R(\pi)D)$ repetition method described below must be used.

2. If $S \ge 2^{n-2}(a_{min}+a_{min+1})$ is established, the (R'DR) contraction method can be executed to obtain relation $A_{min}^2 = A_{min+1}^2$. Since Equation (17) is a quadratic equation of $\cos\theta$, it can provide $\theta$ efficiently.

In this case, there may be other pairs of coefficients that can be contracted, these coefficients are ignored. After the execution of the (R'DR) contraction method, by selectively rotating by $\pi$ the phases of basic vectors having a negative coefficient, a state in which all coefficients are positive or zero can be obtained to determine again whether the condition in lemma 0.1 has been met.

If the (R'DR) contraction method can be executed (p) times for $|\psi_n\rangle$, a flat superposition can be obtained. In contrast, since the quantum gate network is a reversible process, $|\psi_n\rangle$ can be configured from the flat superposition using this network. With Equation (16), $\{A_i\}$ can be calculated within about O(n) steps using a conventional computer. This is because the number of different coefficients in $\{A_i\}$ is (p+1).

(R(π)D) Repetition Method

Methods will be considered that can contract coefficients if the condition in lemma 0.1, that is, $S \geq 2^{n-2}(a_{min}+a_{min+1})$ is not met. For example, the following state is assumed.

$$|\Psi\rangle = [\underbrace{a_0, \ldots,}_{(2^n-1)} \underbrace{a_1, \ldots,}_{1}] \tag{19}$$

In this equation, $0 \leq a_0 < a_1$ is assumed, the number of components $a_0$ is assumed to be $(2^n-t)$, and the number of $a_1$ is assumed to be $(t)$. In this case, $2 \leq t \leq 2^n-2$ is assumed and $(t)$ is assumed to be an even number. If the conditions $0 < t < 2^{n-2}$ and $[(3 \cdot 2^{n-2}-t)/(2^{n-2}-t)] a_0 < a_1$ are established, $|\psi\rangle$ meets $S < 2^{n-2}(a_0+a_1)$.

Figure 8A:
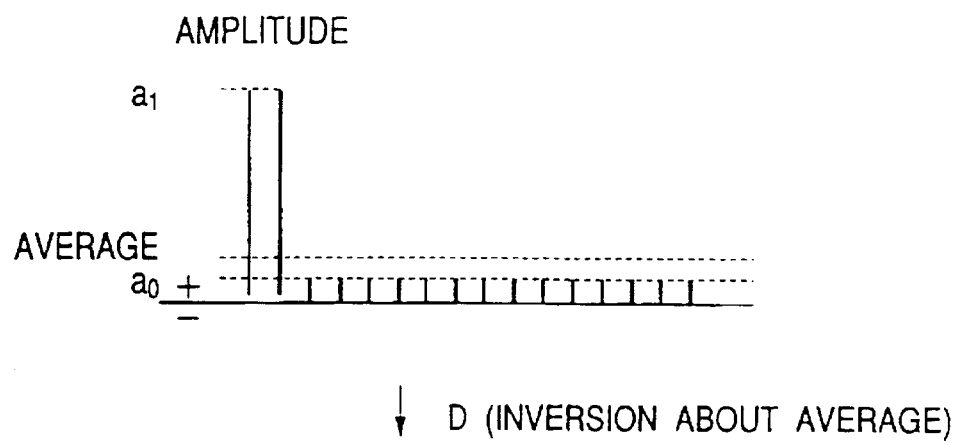
FIGS. 8A, 8B and 8C show the variation of the coefficients of basic vectors when a quantum mechanical state is subjected to an inversion about average operation D and an operation for selectively rotating the phase by $\pi$.
Figure 8B:
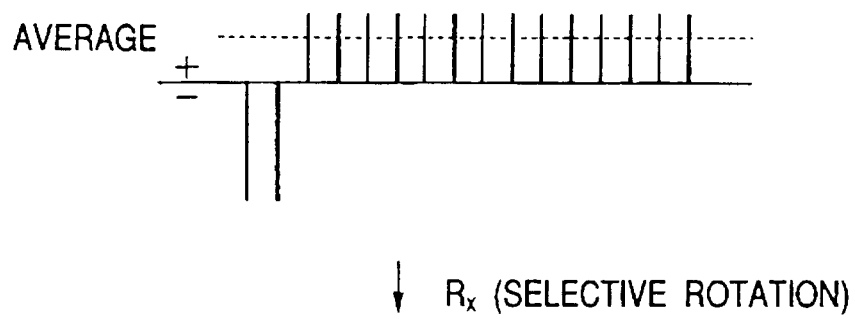
Figure 8C:

In this case, the difference between coefficients $A_0$ and $A_1$ can be reduced performing the inversion about average operation D and then an operation for selectively rotating by π the phases of basic vectors having a negative coefficient. FIGS. 8A, 8B and 8C simply show this operation. FIGS. 8A, 8B and 8C show the coefficients of basic vectors of (8A)$|\psi\rangle$, (8B)D$|\psi\rangle$, and (8C)R(π)D$|\psi\rangle$. These figures show that the difference between coefficients decreases after the application of (R(π)D) to $|\psi\rangle$. Thus, $[S - 2^{n-2}(a_{min}+a_{min+1})]$ is expected to be increased by continuously applying (R(π)D). This will be clarified using the next lemma.

Lemma 0.2

A state given as shown below is considered.

$$|\Psi\rangle = [a_0, \ldots, \underbrace{a_1, \ldots,}_{2h} \underbrace{a_{2(h+m)}, \ldots, a_N}_{2m}].$$

In this case, $N=2^n-1$ and $0 \leq a_c < a_i < a_j$ for $j=2(h+m), \ldots, N$. The number of components $a_0$ is assumed to be $2h$, the number of components $a_1$ is assumed to be $2m$, and $h \geq 1$, $m \geq 1$, and $h+m \leq 2^{n-1}$ are assumed. S, which is the sum of all the coefficients of $|\psi\rangle$, is assumed to meet the following condition.

$$S - 2^{n-2}(a_0+a_1) < 0. \tag{20}$$

The following state is assumed to have been obtained by performing the inversion about average operation on $|\psi\rangle$ and selectively rotating by n the phases of basic vectors having a negative coefficient.

$$R(\pi)D|\psi\rangle = [B_0, \ldots, B_1, \ldots, B_{2(h+m)}, \ldots, B_N],$$

S' is defined as the sum of all the coefficients of R(π)D$|\psi\rangle$.

1. The following relations are established. For $$j=2(h+m), \ldots, N(=2^n-1), 0 < B_0 < B_i < B_j \text{ and } [S'-2^{n-2}(B_0+B_1)]-[S-2^{n-2}(a_0+a_1)] > (2h-2^{n-1})a_0+(2^n-2h)a_1 > 0. \tag{21}$$

2. When the following quantity is defined, $$\begin{cases} \varepsilon^{(0)} = (2h-2^{n-1})a_0 + (2^n-2h)a_1 \\ \varepsilon^{(1)} = (2h-2^{n-1})B_0 + (2^n-2h)B_1 \end{cases} \tag{22}$$

the following relation is established.

$$\epsilon^{(1)} > \epsilon^{(0)} > 0.$$

Proof $D|\psi\rangle$ is determined as follows.

$$D|\psi\rangle = [a'_0, \ldots, a'_1, \ldots, a'_{2(h+n)}, \ldots, a'_N].$$

In this case, $N=2^n-1$ $$\begin{cases} 2^{n-1}a'_0 = S - 2^{n-1}a_0 \\ 2^{n-1}a'_1 = S - 2^{n-1}a_1 \\ 2^{n-1}a'_j = S - 2^{n-1}a_j \text{ for } 2(h+m) \leq j \leq 2^n-1 \end{cases} \tag{23}$$

Obviously, $S-2^{n-1}a_0>0$. Using condition $S-2^{n-2}(a_0+a_1)<0$ provides relation $S-2^{n-1}a_k<0$ for $\forall k \neq 0$. Thus, R(π)D$|\psi\rangle$ is obtained as shown below.

$$\begin{cases} 2^{n-1}B_0 = S - 2^{n-1}a_0 \\ 2^{n-1}B_1 = -S + 2^{n-1}a_1 \\ 2^{n-1}B_j = -S + 2^{n-1}a_j \text{ for } 2(h+m) \leq j \leq 2^n-1 \end{cases} \tag{24}$$

The difference between $B_1$ and $B_0$ is determined as follows.)

$$2^{n-1}(B_1-B_0) = -2[S-2^{n-2}(a_0+a_1)]>0. \tag{25}$$

In this case, the assumption in Equation 20 has been used. In addition, $B_1 < B_j$ is obvious for $j=2(h+m), \ldots, 2^n-1$. Thus, $0 < B_0 < B_1 < B_j$ is obtained for $j=2(h+m), \ldots, 2^n-1$.

Based on the following relations, $$S' = \frac{4h}{2^{n-1}}(S - 2^{n-1}a_0) - S, B_0 + B_1 = a_1 - a_0,$$

Δ, which denotes a change in $[S-2^{n-2}(a_0+a_1)]$ caused by the (R(π)D) operation, can be rewritten as shown below.

$$\Delta = [S' - 2^{n-2}(B_0+B_1)] - [S - 2^{n-2}(a_0+a_1)] \tag{26}$$

$$= 2\left(\frac{2h}{2^{n-1}} - 1\right)S - (4h - 2^{n-1})a_0.$$

To precisely evaluate Δ, several convenient inequalities are provided. Defining S provides the following relation.

$$S = 2ha_0 + 2ma_1 + \sum_{k=2(h+m)}^{2^n-1} a_k \geq 2ha_0 + (2^n - 2h)a_1. \tag{27}$$

Assumptions (20) and (27) allow the following relation to be derived.

$$0 > S - 2^{n-2}(a_0+a_1) \geq 2ha_0 + (2^n-2h)a_1 - 2^{n-2}(a_0+a_1) = (2h-2^{n-2})a_0 + (3 \cdot 2^{n-2}-2h)a_1. \tag{28}$$

Then, rougher inequalities can be obtained by modifying (28).

$$0 > 2ha_0 - 2^{n-2}a_1 + (3 \cdot 2^{n-2}-2h)a_1 = 2ha_0 + (2^{n-1}-2h)a_1. \tag{29}$$

Since $0 \leq a_0 < a_1$, the following inequality is obtained.

$$2h - 2^{n-1} > 0. \tag{30}$$

Reviewing relations (30) and (28) allows the following inequality to be obtained.

$$2h > 3 \cdot 2^{n-2}. \tag{31}$$

Then, the system is ready for strictly evaluating $\Delta$. Relation (31) enables (27) to be assigned to Equation (26).

$$\Delta \geq 2\left(\frac{2h}{2^{n-1}}-1\right)[2ha_0 + (2^n - 2h)a_1] - (4h - 2^{n-1})a_0 \quad (32)$$

$$= (1/2^{n-1})[8h^2 - 8h \cdot 2^{n-1} + 2^{2(n-1)}]a_0 +$$

$$(1/2^{n-1})[-8h^2 + 6h \cdot 2^n - 2^{2n}]a_1$$

$$= (1/2^{n-1})[(4h - 3 \cdot 2^{n-1})(2h - 2^{2n-2}) - 2^{2n-3}]a_0 +$$

$$(1/2^{n-1})[(-4h + 3 \cdot 2^{n-1})(2h - 3 \cdot 2^{n-2}) + 2^{2n-3}]a_1$$

$$= (1/2^{n-1})(4h - 3 \cdot 2^{n-1})[(2h - 2^{n-2})a_0 +$$

$$(3 \cdot 2^{n-2} - 2h)a_1] + 2^{n-2}(a_1 - a_0).$$

Relation (31) indicates that $3 \cdot 2^{n-2} < 2h < 2^n$. Thus, relation $0 < (4h - 3 \cdot 2^{n-1}) < 2^{n-1}$ is derived.

Equation (28) enables $\Delta$ to be evaluated as follows.

$$\Delta > [(2h - 2^{n-2})a_0 + (3 \cdot 2^{n-2} - 2h)a_1] + 2^{n-2}(a_1 - a_0) = (2h - 2^{n-1})a_0 + (2^n - 2h)a_1 > 0 \quad (33)$$

Thus, the first result has been derived.

Definitions (22), (24), (27), and (28) enable the difference between $\epsilon^{(0)}$ and $\epsilon^{(1)}$.

$$\varepsilon^{(1)} - \varepsilon^{(0)} = (2h - 2^{n-1})(B_0 - a_0) + (2^n - 2h)(B_1 - a_1) \quad (34)$$

$$= \frac{1}{2^{n-1}}[(4h - 3 \cdot 2^{n-1})S - 2^{\wedge}\{n\}a_0(2h - 2^{\wedge}\{n-1\})]$$

$$\geq \frac{1}{2^{n-1}}\{(4h - 3 \cdot 2^{n-1})[2ha_0 + (2^n - 2h)a_1] -$$

$$(2h - 2^{n-1})2^n a_0\}$$

$$= \frac{1}{2^{n-1}}[(2h - 3 \cdot 2^{n-2})a_1 - (2h - 2^{n-2})a_0](2^n - 2h)$$

$$> 0.$$

Thus, the second result has been derived.

According to lemma 0.2, the $(R(\pi)D)$ transformation can be continuously applied to constantly make $[S - 2^{n-2}(a_0 + a_1)]$ positive or zero. State $|\psi^{(0)}\rangle$ specified by coefficients $\{a_0, a_1, a_{2(h+m)}, a_{2(h+m)+1}, \ldots, a_{2n-1}\}$ is assumed to meet $S - 2^{n-2}(a_0 + a_1) < 0$. State $|\psi^{(1)}\rangle$ specified by coefficients $\{B_0, B_1, B_{2(l+m)}, B_{2(l+m)+1}, \ldots, B_{2n-1}\}$ is assumed to have been obtained by applying $(R(\pi)D)$ to $|\psi^{(0)}\rangle$. Lemma 0.2.1 provides the following relation:

$$[S' - 2^{n-2}(B_0 + B_1)] - [S - 2^{n-2}(a_0 + a_1)] > \epsilon^{(0)} > 0. \quad (35)$$

where $\epsilon^{(0)}$ is a quantity defined by (22).

Next, $|\psi^{(1)}\rangle$ is assumed to meet $S' - 2^{n-2}(B_0 + B_1) < 0$. $|\psi^{(2)}\rangle$ specified by $\{B_0^{(2)}, B_1(2), B_{2(h+m)}^{(2)}, B_{2(h+m)+1}^{(2)}, \ldots, B_N^{(2)}\}$ is assumed to have been obtained after applying $(R(\pi)D)$ to $|\psi^{(1)}\rangle$. Lemma 0.2.2 provides the following relation.

$$[S'^{(2)} - 2^{n-2}(B_0^{(2)} + B_1^{(2)})] - [S' - 2^{n-2}(B_0 + B_1)] > \epsilon^{(1)} > \epsilon^{(0)} > 0. \quad (36)$$

Accordingly, if $[S'^{(j)} - 2^{n-2}(B_0^{(j)} + B_1^{(j)})] < 0$ is met, $[S'^{(j+1)} - 2^{n-2}(B_0^{(j+1)} + B_1^{(j+1)})]$ increases by at least $\epsilon^{(0)}$ ($>0$). (j) indicates the number of times that $(R(\pi)D)$ has been applied. $\epsilon^{(0)}$ is defined by $\{a_0, a_1\}$ and h.

Thus, $\epsilon^{(0)}$ is an established positive value. The repeated application of $(R(\pi)D)$ ensues that $[S' - 2^{n-2}(B_0 + B_1)]$ is positive or zero.

If $[S'^{(j)} - 2^{n-2}(B_0^{(j)} + B_1^{(j)})]$ becomes positive or zero, the $(R'DR)$ contraction method is started again. Using the $(R'DR)$ contraction method and the $(R(\pi)D)$ repetition operation, $|\psi_n\rangle$ can be constantly transformed into a flat superposition.

Then, it is considered how many times $(R(\pi)D)$ should be applied to $|\psi\rangle$ in order to meet $S'^{(j)} - 2^{n-2}(B_0^{(j)} + B_1^{(j)}) \geq 0$. To evaluate this, the following state is assumed.

$$|\Psi\rangle = [\underbrace{a_0, \ldots}_{t_0}, \underbrace{a_1, \ldots}_{t_1}, a_2, \ldots, \underbrace{a_M, \ldots}_{t_M}]$$

In this case, $$\sum_{k=0}^{M} t_k = 2^a,$$

$0 \leq a_0 < a_1 < a_k$ for $k = 2, \ldots, M$, and $S - 2^{n-2}(a_0 + a_1) < 0$. Then, $a_0, a_1, \ldots, a_M$ are expressed as shown below.

$$a_0 = \frac{\sin\alpha_0}{\sqrt{t_0}}, a_1 = \frac{\cos\alpha_0 \sin\alpha_1}{\sqrt{t_1}}, \ldots, a_M = \frac{\cos\alpha_0 \cos\alpha_1 \ldots \cos\alpha_{M-1}}{\sqrt{t_M}}.$$

$\epsilon^{(0)}$ and the order of $[S - 2^{n-2}(a_0 + a_1)]$ can be evaluated as follows.

$$\epsilon^{(0)} = (2^{n-1} - t)a_0 + ta_1 > 2^{n-1}a_0(2^{(n/2)-1}), \quad (37)$$

$$S - 2^{n-2}(a_0 + a_1) > 2^n a_0 - 2^{n-2}(a_0 + a_1) = 3 \cdot 2^{n-2}a_0 - 2^{n-2}a_1 > -0(2^{n-2}). \quad (38)$$

Thus, the number of times T that $(R(\pi)D)$ is applied is given as shown below.

$$T \sim -\frac{S - 2^{n-2}(a_0 + a_1)}{\epsilon^{(0)}} \sim O(2^{(n/2)-1}).$$

With Equation (24), $\{B_i\}$ can be computed within about $O(n)$ steps using a conventional computer. This is because the number of different coefficients in $\{B_i\}$ is $(\lfloor n/2 \rfloor + 1)$. Next, the simplest example of the $(R(\pi)D)$ repetition operation expressed by Equation (19) will be examined accurately.

Simple Example of the $(R(\pi)D)$ Repetition Method

A simple example of the $(R(\pi)D)$ repetition operation expressed by Equation (19) is considered, and evaluations are conducted to determine how many times $(R(\pi)D)$ should be applied to make $[S' - 2^{n-2}(A_0 + A_1)]$ positive or zero.

$(R(\pi)D)$ is applied to $|\psi\rangle$ given by Equation (19) to obtain $R(\pi)D|\psi\rangle = [B_0, \ldots, B_1, \ldots]$. In this case, the following equations are established.

$$\begin{cases} 2^{n-1}B_0 = S - 2^{n-1}a_0 = (2^{n-1} - t)a_0 + ta_1 \\ 2^{n-1}B_1 = -S + 2^{n-1}a_1 = -(2^n - t)a_0 + (2^{n-1} - t)a_1 \end{cases} \quad (39)$$

(t) is expressed as shown below.

$$\sin^2\theta = \frac{t}{2^n}, \left(\cos^2\theta = \frac{2^n - t}{2^n}\right), \quad (40)$$

where $0<\theta<(\pi/2)$. In addition, $\{a_0, a_1\}$ meets the following equations:

$$a_0 = \frac{\sin\alpha}{\sqrt{2^n - t}}, \quad a_1 = \frac{\cos\alpha}{\sqrt{t}}, \qquad (41)$$

where $0 \leq \alpha < (\pi/2)$ (in handling this model, the following document was referenced: M. Boyer, G. Brassard, P. Hoyer, and A. Tapp, "Tight bounds on quantum searching," LANL quantum physics archive quant-ph/9605034).

Using Equations (39), (40), and (41), $\{B_0, B_1\}$ can be expressed as shown below.

$$\begin{cases} B_0 = (1/\sqrt{2^n})[\cos 2\theta(\sin\alpha/\cos\theta) + \\ 2\sin\theta\cos\alpha] = \sin(\alpha + 2\theta)/\sqrt{2^n - t} \\ B_1 = (1/\sqrt{2^n})[-2\cos\theta\sin\alpha + \cos 2\theta(\cos\alpha/\sin\theta)] = \\ \cos(\alpha + 2\theta)/\sqrt{t} \end{cases} \qquad (42)$$

The coefficients of a state obtained after (j) times of $(R(\pi)D)$ application are represented as $B_0^{(j)}$ and $B_1^{(j)}$. This can be written as follows:

$$B_0^{(j)} = \frac{1}{\sqrt{2^n - t}} \sin(\alpha + 2j\theta), \quad B_1^{(j)} = \frac{1}{\sqrt{t}} \cos(\alpha + 2j\theta), \qquad (43)$$

where $B_{(0)}^0 = a_0$ and $B_1^{(0)} = a_1$.

When $S^{(j)} = (2^n - t) B_0^{(j)} + t B_1^{(j)}$, the following is derived.

$$\begin{aligned} S^{(j)} - 2^{n-2}\left(B_0^{(j)} + B_1^{(j)}\right) &= (3 \cdot 2^{n-2} - t)B_0^{(j)} + (t - 2^{n-2})B_1^{(j)} \\ &= \sqrt{2^n}\left\{\sin[\alpha + (2j+1)\theta] - \frac{1}{2\sin 2\theta}\cos[\alpha + (2j-1)\theta]\right\} \\ &= -\frac{\sqrt{2^{n-2}}}{\sin 2\theta} F^{(j)}. \end{aligned} \qquad (44)$$

In this case, the following equation is established.

$$F^{(j)} = \cos[\alpha + (2j+3)\theta] \qquad (45)$$

Since $0<\theta<(\pi/2)$ and $\sin 2\theta > 0$, whether $[S^{(j)} - 2^{n-2}(B_0^{(j)} + B_1^{(j)})]$ is zero or positive depends on the sign of $F^{(j)}$.

Based on $0 \leq \alpha < (\pi/2)$, if $(2j+3)\theta = (\pi/2)$, then constantly $F^{(j)} \leq 0$, that is, $S^{(j)} - 2^{n-2}(B_0^{(j)} + B_1^{(j)}) \geq 0$. When $j_{MAX}$ is specified as shown below, the number of times that $(R(\pi)D)$ is repeated is prevented from exceeding $j_{MAX}$.

$$j_{MAX} = \frac{1}{2\theta}\left(\frac{\pi}{2} - 3\theta\right).$$

On the other hand, Equation (40) enables $\theta$ to be written as $$\sin\theta = \sqrt{\frac{t}{2^n}}.$$

The minimum value of (t) is 2.
If $t\sim O(1)$ and (n) is sufficiently large, the following relation is obtained.

$$\sin\theta \sim \theta \sim \sqrt{\frac{t}{2^n}}.$$

Setting such a limit provides the following relation.

$$j_{MAX} \sim \frac{\pi}{4}\sqrt{\frac{2^n}{2}} \sim O(2^{n/2}).$$

This indicates that $[S^{(j)} - 2^{n-2}(B_0^{(j)} + B_1^{(j)})]$ can be made positive or zero by repeating the $(R(\pi)D)$ operation at most $O(2^{n/2})$ times.

Configuring a Partly Entangled State Given by a Function with an Even Number of Collisions The partly entangled state having a high symmetry has been discussed. The method described herein, however, is applicable to a partly entangled state that is more generalized.

For the time being, the following function will be considered:

$$f: A = \{0,1\}^n \to B = \{0,1\}^m, \qquad (46)$$

where $0 \leq m \leq n-1$.

$$\forall y \in \{0, 1\}^m$$

Figure 9:
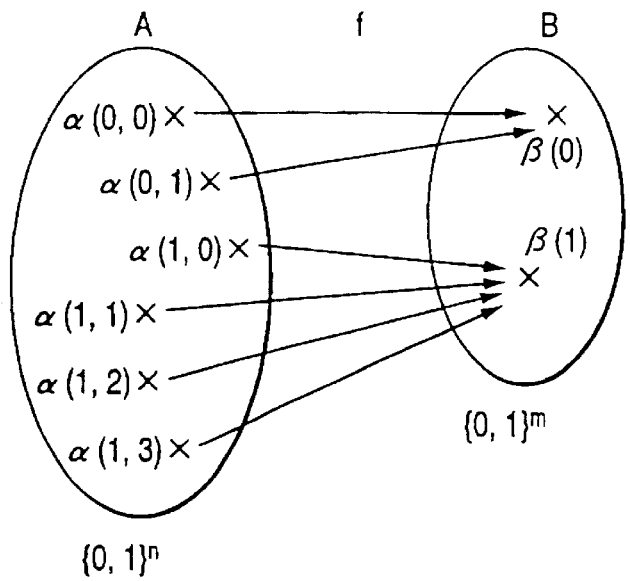
FIG. 9 shows a mapping caused by a function (f) having an even number of collisions.

The number of $x \in \{0, 1\}^n$ meeting $f(x) = y$ for $\forall y \in \{0, 1\}^m$ is an even number including zero. FIG. 9 shows a mapping caused by (f). The number of all the collisions in (f) is even.

The elements of images that are mapped from $\{0, 1\}^n$ by (f) are written as $\{\beta_0, \beta_1, \beta_2, \ldots, \beta_M\}$ where $0 \leq M \leq 2^m - 1$. Then, the following equation is assumed.

$$m = \lceil \log_2(M+1) \rceil$$

This equation serves to save the number of qubits of the second register.

In addition, the elements of $A = \{0, 1\}^n$ that are mapped to $\beta_k$ $(0 \leq k \leq M)$ by (f) is written as $\{\alpha(k, 1), \alpha(k, 2), \ldots, \alpha(k, h_k)\}$. $h_k$ is an even number. $h_k$ is the number of elements in A that may collide when $\beta_k \in B$. Then, the following state is assumed:

$$|\Psi_n\rangle = \sum_{k=0}^{M} \sum_{h=1}^{h_k} a_k |\alpha(k, h)\rangle, \qquad (47)$$

where $\{a_k\}$ is a real number. By providing quantum gates $U_f$ for computing $f(x)$ and using the method described above, such $|\psi_n\rangle$ can be configured. In particular, for a partly entangled state having a high symmetry, function (f) is written as shown below.

f(i) = (number of "1" bits in the binary expression of (i))
However, (n-f(i)) is considered to be identical to f(i), and when:

$$m = \lceil \log_2(n+1) \rceil$$

$$A = \{0, 1\}^n, \quad B = \{0, 1\}^m.$$

Then, the method described above will be explained again in brief. Since the method for transforming $|\psi_n\rangle$ into a flat superposition is simpler than the method for transforming the flat superposition into $|\psi_n\rangle$, the former method is described in short. To actually operate quantum gates, the inverse transformation of the following method may be used and corresponds to the inversion of the direction of the time of a Feynman diagram of a network.

1. All basic vectors having a negative coefficient are selectively rotated by $\pi$. If the state of the register is equal to a flat superposition, the operation is terminated. Otherwise, the process proceeds to step 2.

2. $a_{min}$ is the value of the minimum coefficient of basic vectors, and $a_{min+1}$ is the second smallest coefficient. $a_{min}$ and $a_{min+1}$ are checked for the fulfillment of the sufficient condition for the (R'DR) contraction method. If they meet the sufficient condition, the process passes to step 1. Otherwise, the process advances to step 3.

3. The process executes the $(R(\pi)D)$ transformation and then passes to step 1.

Example of a Specific Quantum Gate Network and Evaluations of the Computation Time A network of quantum gates that constitute $|\psi_n\rangle$ defined by Equation (47) will be considered. Two registers and function (f) given by Equation (46) are provided.

$$|x\rangle \otimes |y\rangle \xrightarrow{f} |x\rangle \otimes |y \oplus f(x)\rangle, \quad (48)$$

The first register is composed of (n) qubits, and the second register is composed of (m) qubits. The second register is used as a control section for selective rotations.

To configure $|\psi_n\rangle$ from a flat superposition, the (R,DR) contraction operation must be performed M times. Thus, the $(DR(\pi))$ transformation is carried out $M \times O(2^n/2)$ times at maximum. If M is not in a polynominal order of (n), the method described herein is not effective. Then, function (f), the selective rotation, and a network for D will be specifically discussed.

First Embodiment

Figure 10:
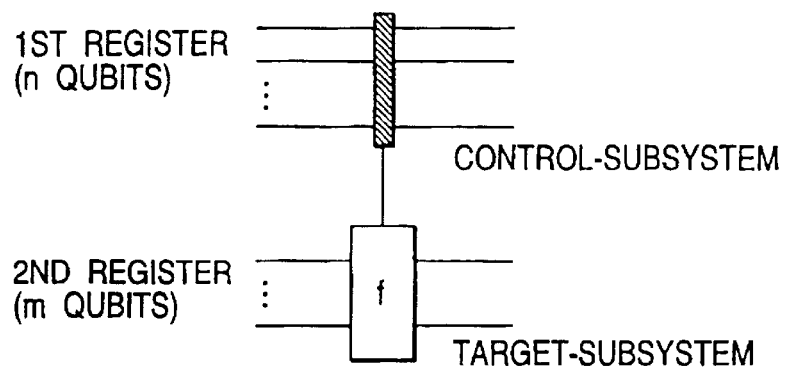
FIG. 10 is a Feynman diagram of a quantum gate network for the function (f)

A quantum gate network for function (f) is considered. FIG. 10 shows a Feynman diagram of function (f). (f) is expressed as a quantum control gate that carries out a unitary transformation in the second register using a value from the first register.

If the (f) control gate can be composed of an elementary quantum gate in a poly(n) order (a polynominal order of (n)), the method described in this embodiment can operate efficiently. In particular, for a function given by f(i)=s(i), the (f) control gate can be composed of poly(n) steps.

A design of a specific quantum network for a control gate for f(i)=s(i) is shown below. The first and second registers are written as shown below.

$|X_n, X_{n-1}, \ldots, X_2, X_1\rangle \otimes |S\rangle$,

The quantum gate network can be expressed as the following program (To write such a program, R. Cleve and D. P. DiVincenzo, "Schumacher's quantum data compression as a quantum computation," Phys. Rev. A 54, 2636 (1996) has been referenced).
Program QUBIT-ADDER1
for k=1 to n do
$S \leftarrow (S+X_k) \mod 2^m$.

In the above description, $X_i$ means the ith qubit of the first register. In addition, S represents the value of the second register. (m) represents the number of qubits in the second register and $m = \lceil \log_2(n+1) \rceil$.

Figure 11:
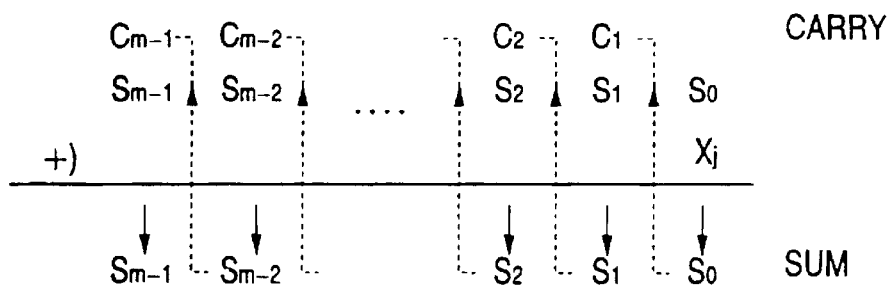
FIG. 11 describes an operation of an auxiliary qubit.

Then, auxiliary qubits $\{C_1, \ldots, C_{m-1}\}$ are introduced. As shown in FIG. 11, Cj represents a carry due to the addition of the (j–1)th bit. The qubits of the second register are expressed as $\{S_0, S_1, \ldots, S_{m-1}\}$. Thus, a program for addition of $X_k$ in program QUBIT-ADDER1 can be written as follows.
Program QUBIT-ADDER2
quantum registers:
$X_k$; a qubit register
$S_0, S_1, \ldots, S_{m-1}$; qubit registers
$C_1, C_2, \ldots, C_{m-1}$; auxiliary qubit registers (initialized and finalized to O)

Figure 12:
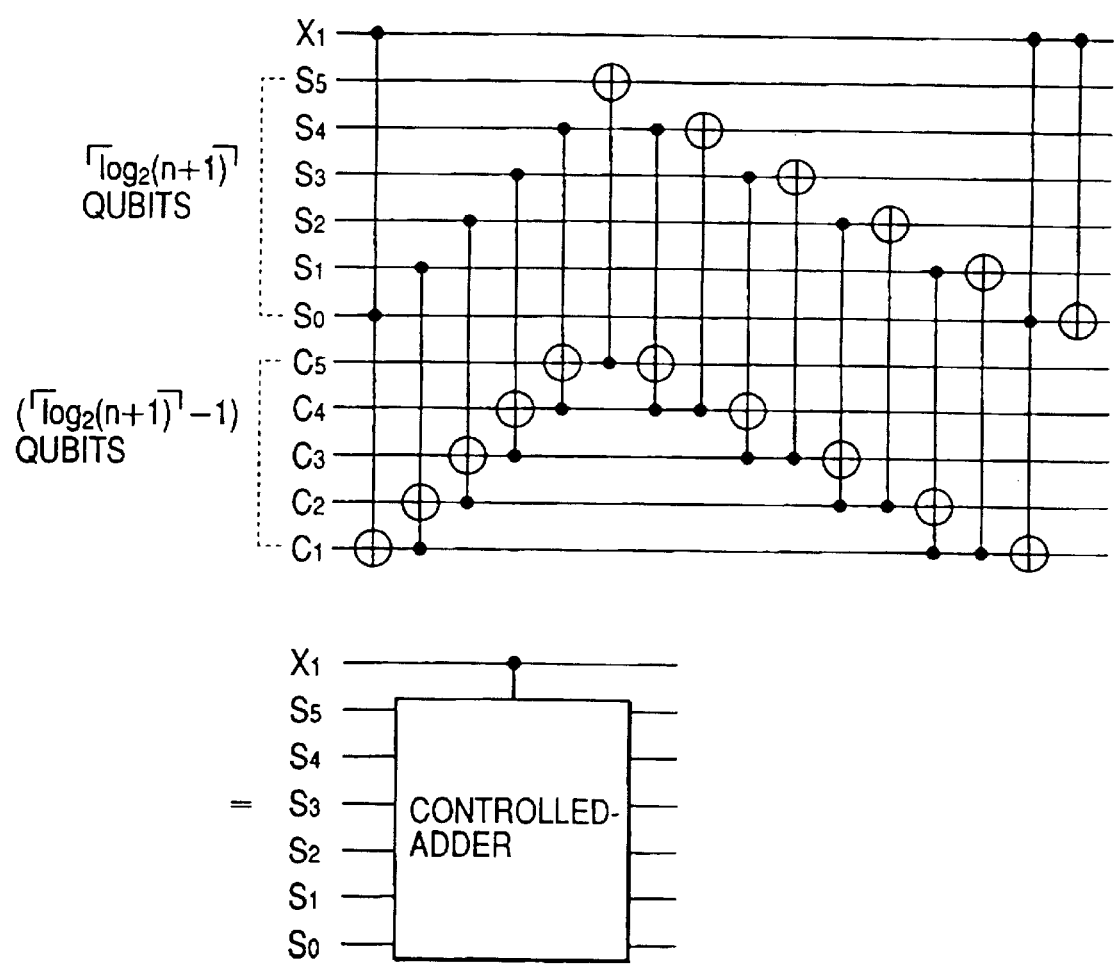
FIG. 12 is a Feynman diagram of a program QUBIT-ADDER2.
Figure 13:
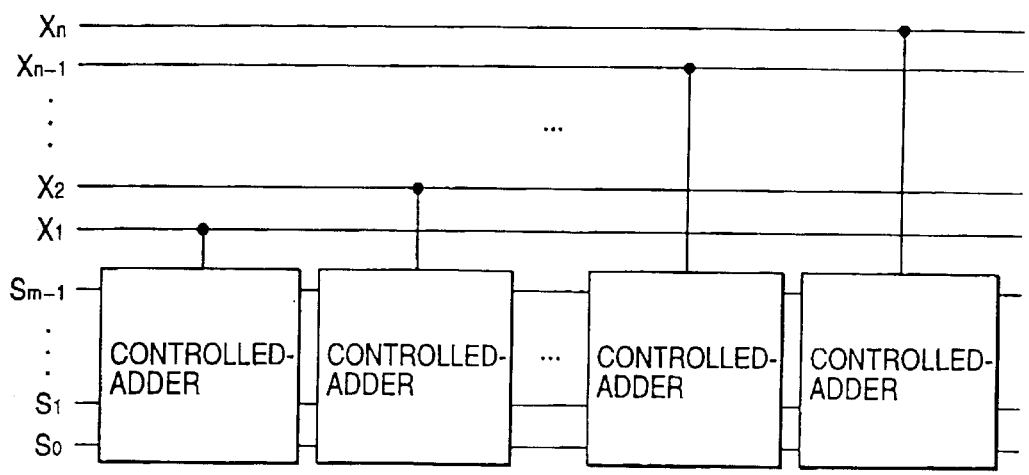
FIG. 13 is a Feynman diagram showing how QUBIT-ADDER2 is repeatedly operated to configure QUBIT-ADDER1.

$C_1 \leftarrow C_1 \oplus (S_0 \wedge X_i)$ for j=2 to m–1 do $C_j \leftarrow C_j \oplus (C_{j-1} \wedge S_{j-1})$ for j=m–1 down to 2 do $S_j \leftarrow S_j \oplus C_j$ $C_j \leftarrow C_j \oplus (C_{j-1} \wedge S_{j-1})$ $S_1 \leftarrow S_1 \oplus C_1$ $C_1 \leftarrow C_1 \oplus (S_0 \wedge X_i) \ S_0 \leftarrow S_0 \oplus X_i$ FIG. 12 is a Feynman diagram of this program for m=6. Program QUBIT-ADDER1 can be configured by repeating for each $X_i$ (i=1, ..., n) the network shown in FIG. 12, as shown in FIG. 13.

Next, evaluations are made as to how many elementary quantum gates are required to configure QUBIT-ADDER1. In FIG. 12, 2(m–1) Toffoli gates and (m) controlled-NOT gates are used to configure QUBIT-ADDER2.

The total number of steps required for QUBIT-ADDER1 is n(3m–2) due to (n) times of repetition of QUBIT-ADDER2. According to this embodiment, any unitary transformation $^\forall U \in U(2)$ for the Toffoli gate, controlled-NOT gate, or 1-qubit is considered to be one unit.

Second Embodiment

Another important quantum network used in the method described herein is a selective rotation. For example, in executing the (R,DR) contraction method, the phases of the two states of the second register are rotated by ($\pm \theta$).

Figure 14:
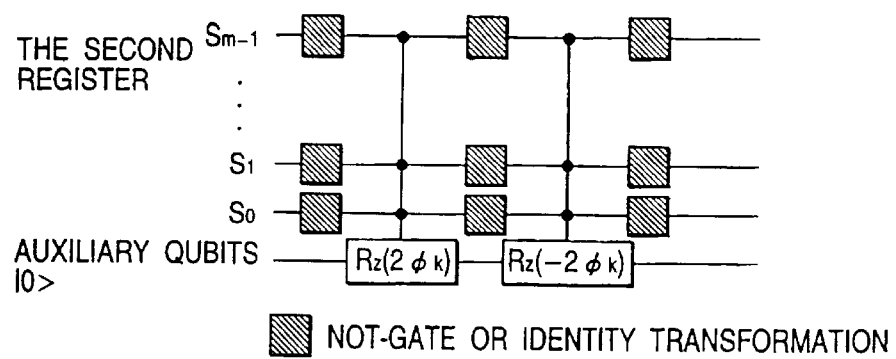
FIG. 14 is a Feynman diagram showing a quantum gate network with a selective rotation in the second registers.

FIG. 14 shows a quantum gate network with a selective rotation in the second register. This network uses two controlled$^m$-$R_z(\alpha)$ gates. A controlled$^m$-U gate having m-qubit control section and one-qubit target section is written as $\Lambda_m(U)$. In this case, $^\forall U \in U(2)$ is established.

$\Lambda_m(U)$ operates as described below. If all the (m) qubits of the control section is equal to $|1\rangle$, $\Lambda_m(U)$ applies a U transformation to the target qubit. If the m-qubit control section is not in the $|1 \ldots 1\rangle$ state, $\Lambda m(U)$ does nothing to the target qubit. For example, a Toffoli gate is represented as $\Lambda_2(\sigma_x)$ and a controlled-NOT gate is represented as $\Lambda_1(\sigma_x)$. $\Lambda_0$ represents an arbitrary U(2) gate. $R_z(\alpha)$ is one form of U(2) transformation and is given as shown below.

$$R_z(\alpha) = \exp\left(\frac{i}{2}\alpha\sigma_z\right) = \begin{bmatrix} \exp(i\alpha/2) & 0 \\ 0 & \exp(-i\alpha/2) \end{bmatrix}$$

If auxiliary qubit is set to 0>, $\Lambda_m(R_z(\alpha))$ emits unique value $\exp(i\alpha/2)$ only when the second register is in the $|1 \ldots 1\rangle$. Such a method is called "kicked back" (see R. Cleve, A.

Ekert, C. Macchiavello, and M. Mosca, "Quantum Algorithms Revisited, LANL quantum physics archive quant-ph/9708016).

In FIG. 14, the shaded boxes represent NOT gates or identity transformations. The NOT-gate is given by $\sigma_x$. Basic vectors to be rotated are determined depending on whether the shaded box is a NOT-gate or an identity transformation.

For $(m \geq 6)$, $\Lambda_m(R_z(\alpha))$ can be composed of $16(m-4)\Lambda_2$ $(\sigma_x)$ gates, $4\Lambda_1(\sigma_x)$ gates, and $4\Lambda_0$ gates. This will be shown below (reference: Barenco, C. H. Bennett, R. Cleve, D. P. Divincenzo, N. Margolus, P. Shor, T. Sleator, J. Smolin, and H. Weinfurter, "Elementary gates for quantum computation," Phys. Rev. A52, 3457 (1995)).

Thus, for $(m \geq 6)$, $\Lambda_m(R_z(\alpha))$ is composed of at most $8(2m-7)$ quantum elementary gates. FIG. 14 shows that the selective rotation in the second register is composed of at most the following number of steps.

$$3m+2\cdot 8(2m-7)=7(5m-16)-0(m).$$

Figure 15:
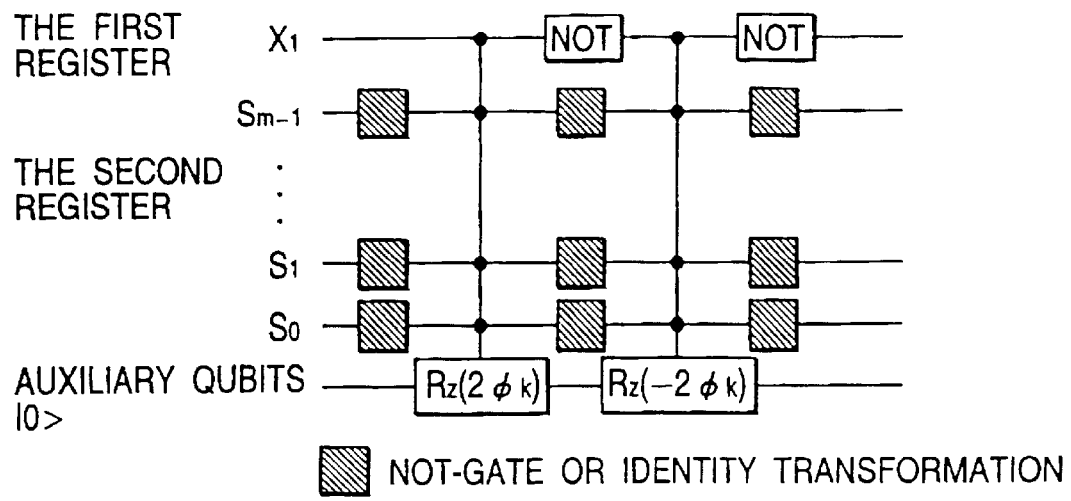
FIG. 15 is a Feynman diagram showing a network of quantum gates that executes a selective rotation in the second register for $\eta=n-\eta=n/2$.

Furthermore, if (n) is an even number and $\eta = n - \eta = n/2$, the use of first qubit $X_1$ of the first register enables the phase to be rotated by $\theta$ for half the elementary vectors with $s(k)=\eta$ while enabling the phase to be rotated by $(-\theta)$ for the remaining basic vectors. FIG. 15 shows a network for this operation. In configuring $|\psi_n\rangle$, the selective rotation in the second register can be executed in about $O(\log_2 n)$ steps.

Third Embodiment

Finally, a network for D is considered. Before applying D to the first register, the second register must be initialized to $|0 \ldots 0\rangle$. Thus, in executing the (R'DR) contraction method, $(R'U_f D U_f^{-1} R)$ must be applied to the register where $U_f$ is an unitary transformation of function (f) defined by Equation (48).

D is known to be decomposable as follows (see L. K. Grover, "A fast quantum mechanical algorithm for database search," LANL quantum physics archive quant-ph/9605043 and L. K. Grover, "Quantum Mechanics Helps in Searching for a Needle in a Haystack," Phys. Rev. Lett. 79, 325 (1997)).

$$D = H^{(n)} R H^{(n)},$$

but $$H^{(n)} = H(x) \ldots (x) H$$

means a Hadamard transformation for n-qubits, and R represents a selective n rotation for $|0 \ldots 0\rangle$ in the first register.

Figure 16:
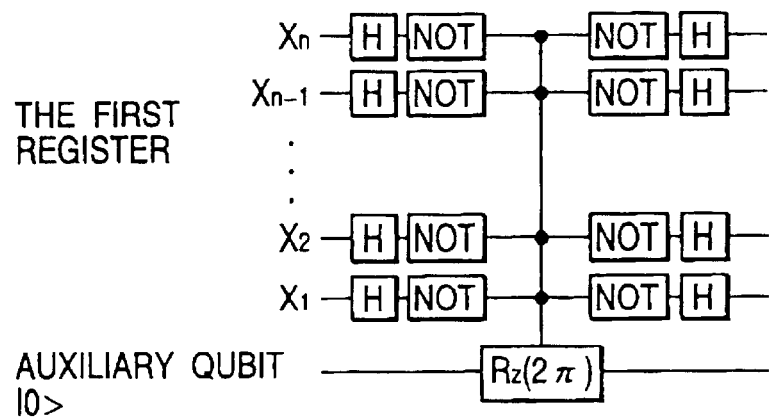
FIG. 16 is a Feynman diagram showing a network for D.

FIG. 16 shows a network for D. The network consists of $4n \Lambda_0$ gates and one $\Lambda_n(R_z(2\pi))$ gates, requiring $4(5n-14)$ elementary operations. D is composed of $O(n)$ steps.

Fourth Embodiment

The number of elementary operations required to configure $|\psi_n\rangle$ from a flat superposition is evaluated in this embodiment. If M (number of components of an image in mapping (f) defined by Equation (46)) is about poly(n) and function $U_f$ defined by Equation (48) can be composed of about poly(n) elementary gates, repetitive operations of $(R(\pi)D)$ definitely occupy most of the steps.

Figure 17:
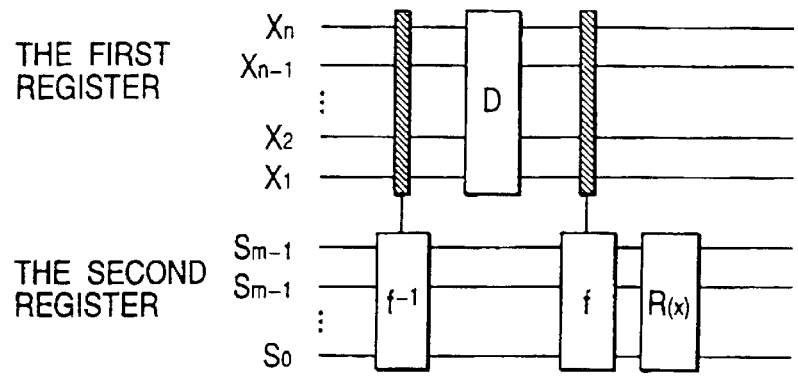
FIG. 17 is a Feynman diagram showing a network for a subroutine $(R(\pi)D)$.

A network for subroutine $(R(\pi)D)$ is given in FIG. 17. Although the number of steps required to configure function $U_f$ depends on (f), (first embodiment) has already shown that about $O(n\log_2 n)$ steps are required to configure, for example, $|\psi_n\rangle$. In addition, (third embodiment) has already shown that $4(5n-14)$ steps are required for D.

Figure 18:
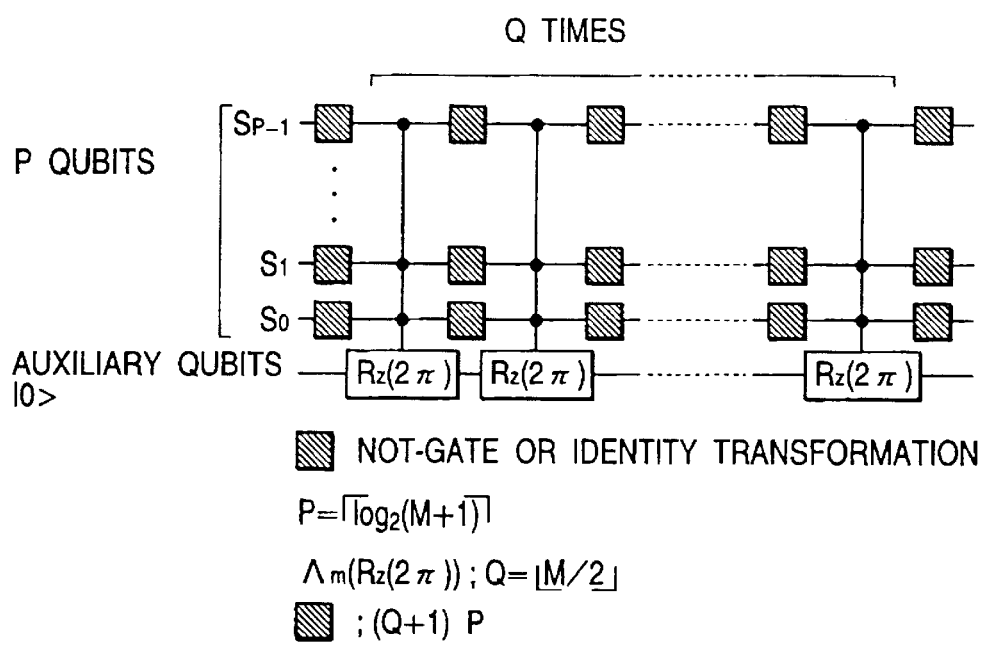
FIG. 18 is a Feynman diagram showing a selective $\pi$ phase rotation in the first register.

FIG. 18 shows a Feynman diagram of a selective $\pi$ rotation in the $(R(\pi)D)$ operation. In this case, $R(\pi)$ is an operation for inverting the signs of basic vectors having a negative coefficient, so at most $P = \lfloor M/2 \rfloor$ basic vectors of the second register are rotated.

Thus, if: $P = \lfloor M/2 \rfloor$ $Q = \lceil \log_2(M+1) \rceil$ then the selective rotation is composed of $(P+1) \cdot Q \Lambda_0$ gates and $P \Lambda_Q (R_z(2\pi))$ gates. $R(\pi)$ can be carried out in $O(M\log_2 M)$ steps.

A possible evaluation is that the $(R(\pi)D)$ transformation requires $O(n\log_2 n)$ steps in order to configure $|\psi_n\rangle$. The number of times that $(R(\pi)D)$ is repeated between $(R'\{\eta\}DR\{\eta\})$ contraction operation is at most about $O(2^{n/2})$. If the $(R(\pi)D)$ repetition operation is performed each time the $(R'\{\eta\}DR\{\eta\})$ contraction operation is performed, the $(R(\pi)D)$ repetition operation is performed $\lfloor n/2 \rfloor$ times. Thus, in total, $O(n^2\log_2 n) \times 2^{n/2}$ steps are required.

In general, an arbitrary transformation $U(\in U(2^n))$ is known to be composable of at most $O(n^3 2^{2n})$ elementary gates (see A. Barenco, C. H. Bennett, R. Cleve, D. P. Divincenzo, N. Margolus, P. Shor, T. Sleator, J. Smolin, and H. Weinfurter, "Elementary gates for quantum computation," Phys. Rev. A52, 3457 (1995)). Thus, the method described in this embodiment reduces the number of elementary quantum gates compared to conventional cases.

Figure 19:
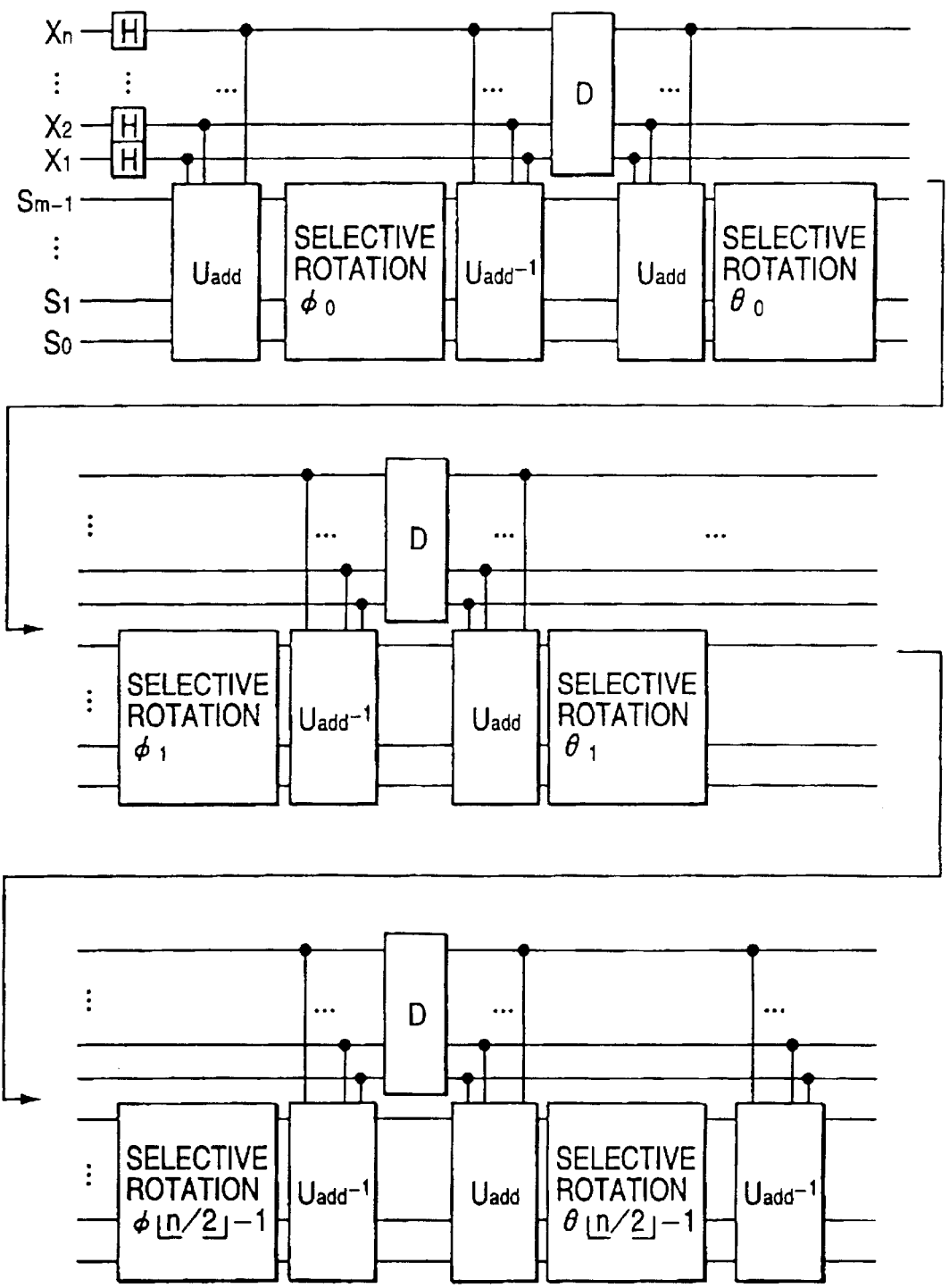
FIG. 19 is a Feynman diagram of the quantum gates in a case in which $|\psi n\rangle$ can be configured using merely a $(R'\{\eta\}DR\{\eta\})$ contraction method without a $(R(\pi)D)$ repetition operation.

In addition, in configuring $|\psi_n\rangle$, a quantum gate network can be composed of only the $(R'\{\eta\}DR\{\eta\})$ contraction method without a $(R(\pi)D)$ repetition operation, depending on the value of $\{a_n\}$. A network for this case is given in FIG. 19.

First, Hadamard transformation H is applied independently to (n) qubits of the first register. Next, a block $U_{add}$ is operated that computes the total number of bits in the first register that are set to '1'. Subsequently, a set of three operations including a selective rotation, an inversion about average operation $U_{add} D U_{add}^{-1}$, and a selective operation are repeated (p) times.

Finally, to return all the qubits of the second register to initial state $|0\rangle$, $U_{add}^{-1}$ is operated. $U_{add}^{-1}$, which is a network block for carrying out the inverse transformation of $U_{add}$, operates the Feynman diaphragms in FIGS. 12 and 13 leftward, that is, in the direction opposite to the time. Thus, the total amount of computations is expressed as shown below.

$$n+2\times n(3\lceil \log_2(n+1) \rceil -2)+\lfloor n/2 \rfloor \{2\times 7(5\lceil \log_2(n+1) \rceil -16)+4(5n-14)+2\times n(3\lceil \log_2(n+1) \rceil -2)\} \sim 3n^2\log_2 n$$

Furthermore, according to the method described herein, before constructing a quantum gate network, a conventional computer must be used to determine the phase rotation parameter and the order of basic vectors with their phase selectively rotated. In this case, the number of steps required for conventional computations can also be limited to about $O((n^2\log_2 n) \times 2^{n/2})$.

Fifth Embodiment

This embodiment considers how a $\Lambda_n R_z(\alpha)$ gate is configured using elementary quantum gates. The cited document (A. Barenco, C. H. Bennett, R. Cleve, D. P. Divincenzo, N. Margolus, P. Shor, T. Sleator, J. Smolin, and H. Weinfurter, "Elementary gates for quantum computation," Phys. Rev. A52, 3457 (1995)) discloses various approaches for configuring $\Lambda_n(U)$ using elementary quantum gates for ($^\forall U \in U(2)$).

First, the following relations are noted.

$$R_z(\alpha/2)\sigma_x R_z(-\alpha/2)\sigma_x = R_z(\alpha)$$

$$R_z(\alpha/2)R_z(-\alpha/2) = I$$

Figure 20:
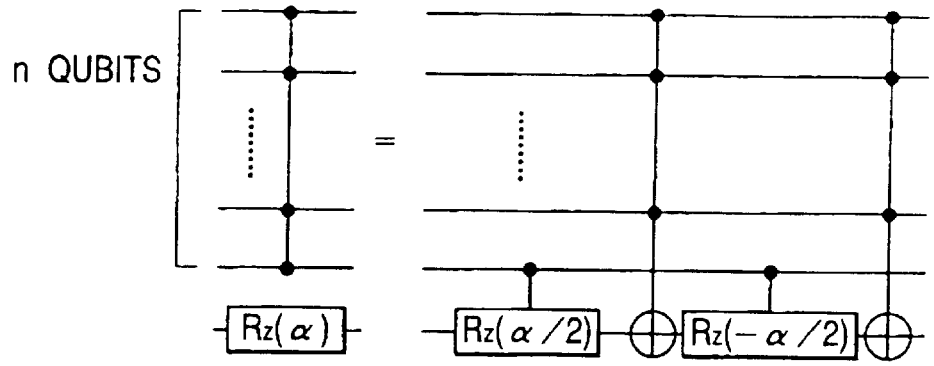
FIG. 20 is a Feynman diagram showing a method for dividing $\Lambda_n(R_z(\alpha))$ into simpler quantum gates.
Figure 21:
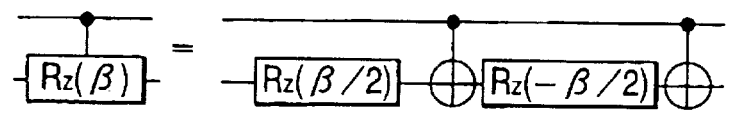
FIG. 21 is a Feynman diagram showing a conventional processing for n=2.

Thus, as shown in FIG. 20, $\Lambda_n(R_z(\alpha))$ can be decomposed into $\Lambda_1(R_z(\alpha/2))$, $\Lambda_1(R_z(-\alpha/2))$, and two $\Lambda_{n-1}(\sigma_x)$. Furthermore, $\Lambda_1(R_z(\beta))$ can be decomposed into $R_z(\beta/2)$, $R_z(-\beta/2)$, and two controlled-NOT gates.

Then, for the time being, how a $\Lambda_{n-1}(\sigma_x)$ gate is configured on a (n+1)-qubit network will be discussed. It should be particularly noted that one qubit that has not been used by $\Lambda_{n-1}(\sigma_x)$ remains on the network.

Figure 22:
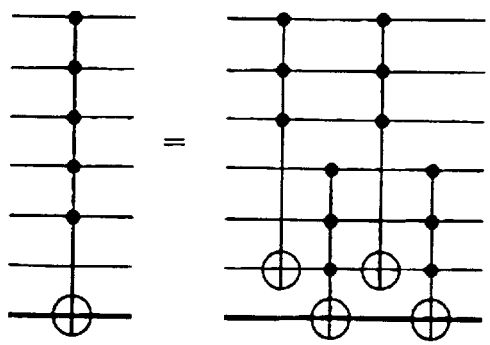
FIG. 22 is a Feynman diagram showing a method operative on a 7-qubit network for dividing $\Lambda_5(\sigma_x)$ into simpler quantum gates.

For n=4, $\Lambda_3(\sigma_x)$ can be decomposed into four Toffoli gates. For n=5, $\Lambda_4(\sigma_x)$ can be decomposed into two Toffoli gates and two $\Lambda_3(\sigma_x)$ gates, so $\Lambda_4(\sigma_x)$ can be decomposed into 10 Toffoli gates. For n=6, $\Lambda_5(\sigma_x)$ can be decomposed into four $\Lambda_3(\sigma_x)$ gates, as is apparent from FIG. 22. This means that $\Lambda_5(\sigma_x)$ can be decomposed into 16 Toffoli gates.

A case of $n \geq 7$ is considered as follows. A $\Lambda_{n-1}(\sigma_x)$ gate can be decomposed into two $\Lambda_{m1}(\sigma_x)$ gates and two $\Lambda_{m2}(\sigma_x)$ gates. In this case, $$m_1 = \lceil (n+1)/2 \rceil,$$

Figure 23:
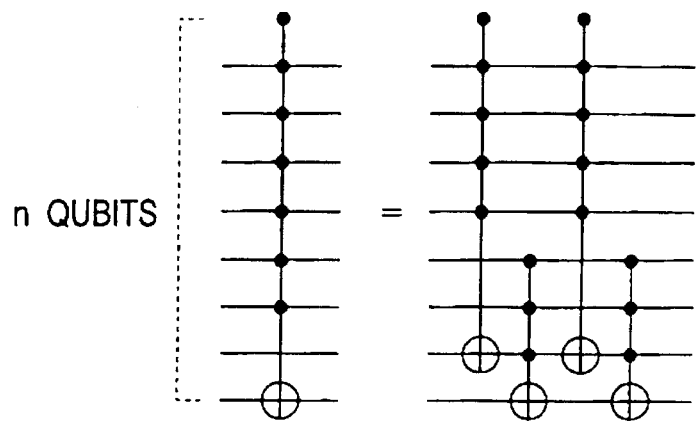
FIG. 23 is a Feynman diagram showing a method operative on a (n+1)-qubit network for dividing $\Lambda_{n-1}(\sigma_x)$ into simpler quantum gates for $n \geq 7$.

$m_2 = n - m_1$. FIG. 23 shows a case of n=8, $m_1=5$, and $m_2=3$.

Such a decomposition provides $m_2$ unused qubits for $\Lambda m_2(\sigma_x)$ while providing $m_1$ unused qubits for $\Lambda m_1(\sigma^x)$. The following relation is obtained for both $\Lambda m_1(\sigma^x)$ and $\Lambda m_2(\sigma_x)$.

(number of qubits in the control section)−(number of qubits unused)≦2.  (49)

As regards this, the following fact is known from the cited document (A. Barenco, C. H. Bennett, R. Cleve, D. P. Divincenzo, N. Margolus, P. Shor, T. Sleator, J. Smolin, and H. Weinfurter, "Elementary gates for quantum computation," Phys. Rev. A52, 3457 (1995)).

Figure 24:
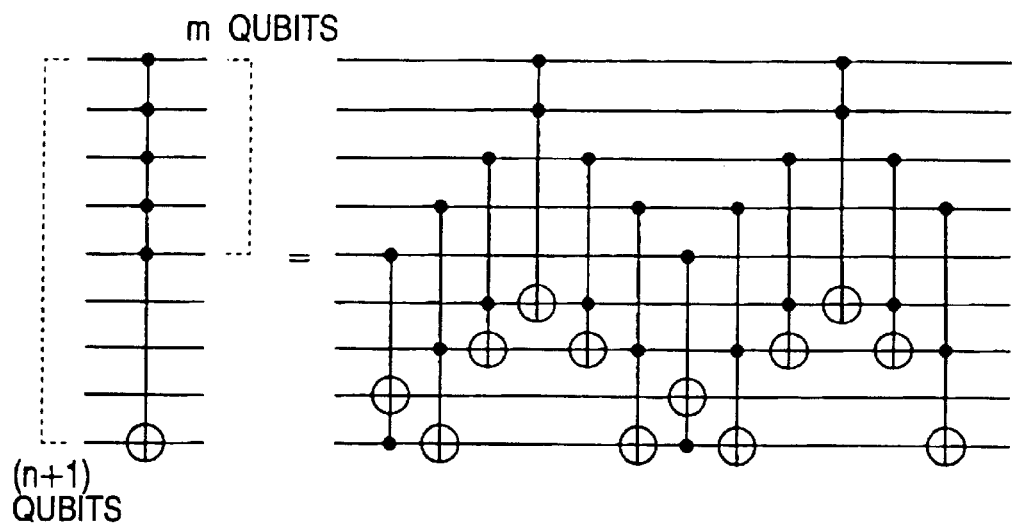
FIG. 24 is a Feynman diagram showing a method operative on the (n+1)-qubit network for dividing $\Lambda_m(\sigma_x)$ into simpler quantum gates for $n \geq 7$.

For $n \geq 4$, if:

$$m \in \{3, \ldots, \lceil (n+1)/2 \rceil\}$$

on a (n+1)-qubit network (that is, the relation in Inequity (49) is established), the $\Lambda_m(\sigma_x)$ gate can be decomposed into 4(m−2) Toffoli gates. FIG. 24 shows a case of n=8 and m=5.

Accordingly, for $n \geq 7$, on the (n+1)-qubit network, $\Lambda_{n-1}(\sigma_x)$ can be decomposed into 8(n−4) Toffoli gates based on the following equation.

$$2 \cdot 4(m_1-2) + 2 \cdot 4(m_2-2) = 8(n-4).$$

Figure 25:
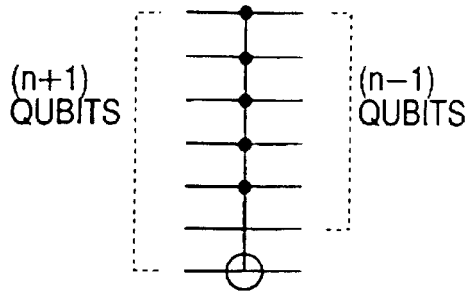
FIG. 25 is a table showing into how many basic gates $\Lambda_{n-1}(\sigma_x)$ can be divided on the (n+1)-qubit network.
Figure 26:
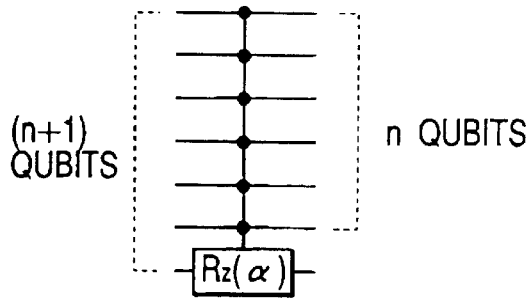
FIG. 26 is a table showing into how many basic gates $\Lambda_n(R_z(\alpha))$ can be divided on the (n+1)-qubit network.

FIGS. 25 and 26 show the number of elementary quantum gates required to configure $\Lambda_{n-1}(\sigma_x)$ and $\Lambda(R_z(\alpha))$.

Sixth Embodiment

The method and apparatus for configuring an entangled state as described above can be implemented by simply providing an arbitrary unitary transformation of one qubit and controlled-NOT gates between two qubits.

The cited document (J. I. Cirac and P. Zoller, "Quantum Computations with Cold Trapped Ions," Phys. Rev. Lett. 74}, 4091 (1995)) discusses a method for implementing controlled-NOT gates using a method called "Cold Trapped Ions." In this case, (n) ions are linearly captured, and the basic and first excited states of each ion are considered to be $\{|0\rangle, |1\rangle\}$ of a qubit. In addition, quantum gates are operated by externally irradiating each ion with laser beams.

Linearly captured ions are engaged in Coulomb interactions, so that each ion vibrates around its balanced point. When this vibration mode is quantized, the ions become phonons, which can then be used as auxiliary qubits. The above document ingeniously uses these phonons to implement controlled-NOT gates. Such a system can implement the method and apparatus for configuring an entangled state as described in the above embodiments.

By configuring $|\psi_n\rangle$ using (n) captured ions and carrying out the Ramsey spectroscopy according to the procedure disclosed in the cited document (S. F. Huelga, C. Macchiavello, T. Pellizzari, A. K. Ekert, M. B. Plenio. and J. I. Cirac, "Improvement of Frequency Standards with Quantum Entanglement," Phys. Rev. Lett. 79, 3865 (1997)), the difference in energy level between the basic and first excited states of ions can be measured with accuracy beyond the shot noise limit.

The method and apparatus for configuring an entangled state as described in the above embodiments reduces the total number of elementary quantum gates required, that is, the time required for operations compared to the configuration of general unitary transformations. As a result, the desired state $|\psi_n\rangle$ can be configured in a time shorter than the time scale in which a decoherence may occur in linearly captured ions.

Seventh Embodiment

The cited document (C. H. Bennett, C. A. Fuchs, and J. A. Smolin, "Entanglement-Enhanced Classical Communication on a Noisy Quantum Channel," Quantum Communication, Computing, and Measurement, edited by Hirota et al., Plenum Press, New York, p.79 (1997)) discusses a method for transferring through a noisy quantum channel, classical binary information consisting of "0" and "1"

This document discloses that if two channels called "two-Pauli channels" and containing quantum noise are used, a partly entangled state of two qubits is optimal for transmitting classical information.

Thus, the method and apparatus for configuring an entangled state as described in the above embodiments is applicable to the field of quantum communication.

Figure 27:
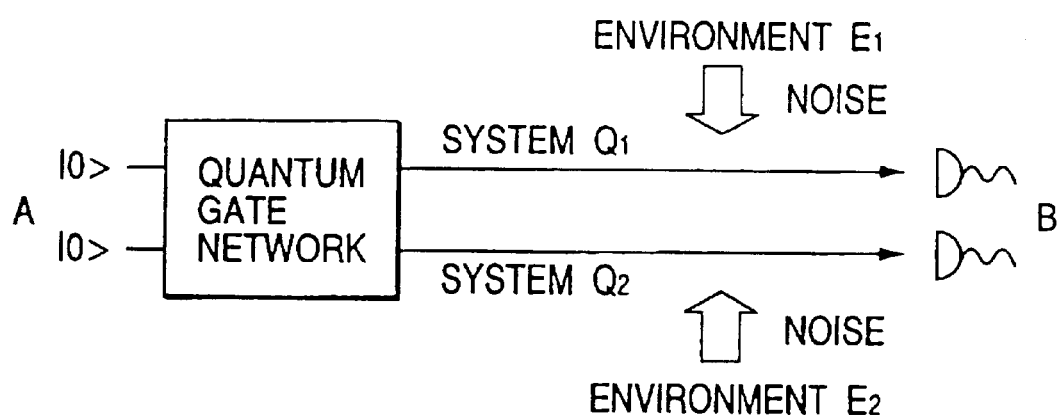
FIG. 27 shows an example of a quantum communication apparatus using a method and apparatus for configuring an entangled state according to the present invention.

For example, as shown in FIG. 27, a transmitter A uses a quantum gate network based on the method described in the embodiments in order to configure a target entangled state, and transmits it through two circuits with noise. A recipient B detects this to receive classical binary information.

According to the above embodiments, if a quantum mechanical state consisting of a plurality of two-level systems is expressed by a superposition of orthonormal bases in which each two-level system assumes a basic or an excited state, then simple operations can be used to configure a desired partly-entangled quantum mechanical state in which the coefficients of the bases are all real numbers.

In this case, the desired quantum mechanical state can be configured using a small number of steps.

In addition, only a small amount of computations are required to determine the order and parameters of the operations.

In addition, by using the cold trapped ions method to provided ions as the two-level systems, the difference in energy level between the basic and first excited states of ions can be precisely measured based on the Ramsey spectroscopy.

In addition, with the quantum mechanical state configured as described above, transmitted information can encoded so that the quantum mechanical state is communicated as a signal on a quantum communication circuit. In this case, information can be encoded into a state that resists noise.

Although the present invention has been described in its preferred form with a certain degree of particularity, many apparently widely different embodiments of the invention can be made without departing from the spirit and scope thereof. It is to be understood that the invention is not limited to the specific embodiments thereof except as defined in the appended claims.

What is claimed is:

1. A state configuring method for configuring a desired partly-entangled quantum mechanical state, expressed by a superposition of orthonormal bases in which each two-level system assumes a basic or an excited state and the coefficients of the bases are all real numbers, by performing an operation that is a combination of a selective rotation operation and an inversion about average operation, where the selective rotation operation and the inversion about average operation are implemented by unitary transformations and controlled-NOT gates.

2. The state configuring method according to claim 1, wherein the operation that is the combination of the selective rotation operation and the inversion about average operation is performed on a flat superposition to configure the desired quantum mechanical state.

3. The state configuring method according to claim 2, wherein a Hadamard transformation is applied to an initial state to obtain the flat superposition.

4. The state configuring method according to claim 1, wherein the operation that is the combination of the selective rotation operation and the inversion about average operation is an operation that is a combination of a series of operations for sequentially performing a selective rotation, an inversion about average operation, and a selective rotation; and an operation for repeating a selective $\pi$ rotation and an inversion about average operation.

5. The state configuring method according to claim 1, wherein the Cold Trapped Ions method is used to provide ions as the two-level systems, and wherein external laser irradiation allows quantum gates to perform the operations, in which a quantized phonon mode resulting from Coulomb interactions of the ions is used to provide the controlled-NOT gates, thereby configuring the desired quantum mechanical state.

6. The state configuring method according to claim 5, wherein a partly entangled state having an invariant symmetry is configured as the desired quantum mechanical state, and wherein the difference in energy between the basic and first excited states of ions is precisely measured based on the Ramsey spectroscopy.

7. A communication method for encoding transmitted information as a quantum mechanical state configured by a state configuring method according to claim 1, and executing communication using the quantum mechanical state as a signal on a quantum communication circuit.

8. The communication method according to claim 7, wherein said state configuring method is used to encode information to be transmitted as a particular partly entangled state that resists noise in the quantum communication circuit.

9. A state configuration apparatus comprising:
selective rotation operation means for performing a selective rotation operation on a plurality of two-level systems; and
inversion about average operation means for performing an inversion about average operation on said plurality of two-level systems,
wherein a desired partly-entangled quantum mechanical state, expressed by a superposition of orthonormal bases in which each two-level system assumes a basic or an excited state and the coefficients of the bases are all real numbers, is configured using an operation comprising a combination of an operation performed by said selective rotation operation means and an operation performed by said inversion about average operation means, and said selective rotation operation means and said inversion about average operation means are implemented by unitary transformations and controlled-NOT gates.

10. The state configuring apparatus according to claim 9, wherein the operation comprising the combination of the operation performed by said selective rotation operation means and the operation performed by said inversion about average operation means is performed on a flat superposition to configure the desired quantum mechanical state.

11. The state configuring apparatus according to claim 10, further comprising Hadamard transformation means for transforming an initial state to the flat superposition.

12. The state configuring apparatus according to claim 9, wherein the operation comprising the combination of the operation performed by said selective rotation operation means and the operation performed by said inversion about average operation means is an operation that is a combination of a series of operations for sequentially performing a selective rotation, an inversion about average operation, and a selective rotation; and an operation for repeating a selective $\pi$ rotation and an inversion about average operation.

13. The state configuring apparatus according to claim 9, wherein the Cold Trapped Ions method is used to provide ions as said two-level systems, and wherein external laser irradiation allows quantum gates to perform the operations, in which a quantized phonon mode resulting from Coulomb interactions of the ions is used to provide the controlled-NOT gates, thereby configuring the desired quantum mechanical state.

14. The state configuring apparatus according to claim 13, wherein a partly entangled state having an invariant symmetry is configured as the desired quantum mechanical state, and wherein the difference in energy between the basic and first excited states of ions is precisely measured based on the Ramsey spectroscopy.

15. A communication apparatus for encoding transmitted information as a quantum mechanical state configured by a state configuring apparatus according to claim 9, and executing communication using the quantum mechanical, state as a signal on a quantum communication circuit.

16. The communication apparatus according to claim 15, wherein said state configuring apparatus is used to encode information to be transmitted as a particular partly entangled state that resists noise in said quantum communication circuit.

* * * * *

UNITED STATES PATENT AND TRADEMARK OFFICE
CERTIFICATE OF CORRECTION

PATENT NO. : 6,760,136 B2
APPLICATION NO. : 09/928499
DATED : July 6, 2004
INVENTOR(S) : Hiroo Azuma It is certified that error appears in the above-identified patent and that said Letters Patent is hereby corrected as shown below:

Column 2,
Equation (1) should read -- $|\psi_n\rangle = \sum_{k=0}^{n/2} a_k |k\rangle_s \text{ for } n \geq 2$ --.

Column 3,
Line 18, "be" should be deleted (first occurrence).

Column 4,
Line 52, "7-quibit" should read -- 7-qubit --.

Column 7,
Equation (5) should read:

-- $$|s_3\rangle = R\{\eta\}|s_2\rangle = \frac{1}{\sqrt{2^n}}\left[\underbrace{\exp(i\phi),\ldots,\exp(i\phi)}_{h},\underbrace{\exp(-i\phi),\ldots,\exp(-i\phi)}_{h},\underbrace{1,\ldots,1}_{2^n-2h}\right]$$ --; and Line 47, "is" should be deleted.

Column 8,
Lines 17-20, should read

-- $$|\psi_4\rangle = \sqrt{\frac{3}{7}}|0\rangle_s + \frac{1}{7\sqrt{2}}|1\rangle_s + \frac{1}{7\sqrt{2}}|2\rangle_s$$ --; and Line 67, "qubits," should read -- qubit --.

Column 10,
Line 17, "qubits," should read -- qubit --.

Column 12,
Lines 2-4, should read

-- $|\psi_4\rangle = a_0(|0000\rangle + |1111\rangle)$
  $+ a_1(|0001\rangle + |0010\rangle + |0100\rangle + |1000\rangle + |1110\rangle + |1101\rangle + |1011\rangle + |0111\rangle)$
  $+ a_2(|0011\rangle + |0101\rangle + |0110\rangle + |1001\rangle + |1010\rangle + |1100\rangle)$ --.

Line 8, "qubits," should read -- qubit --;
Line 16, "i" should read -- $\underline{i}$ --; and
Lines 20-24, should read -- $|\psi\rangle = \frac{1}{4}(e^{i\phi}|\underline{0}\rangle + |\underline{1}\rangle + \ldots + |\underline{14}\rangle + e^{-i\phi}|\underline{15}\rangle)$ --

UNITED STATES PATENT AND TRADEMARK OFFICE
CERTIFICATE OF CORRECTION

PATENT NO. : 6,760,136 B2
APPLICATION NO. : 09/928499
DATED : July 6, 2004
INVENTOR(S) : Hiroo Azuma Page 2 of 3

It is certified that error appears in the above-identified patent and that said Letters Patent is hereby corrected as shown below:

Column 13,
Lines 49-50 should read

-- $e^{i\kappa} = \dfrac{2r_1(\phi) + r_2(\phi)(2 - 5\exp(-i\delta) + 3\exp(i\delta))}{|2r_1(\phi) + r_2(\phi)(8 - 5\exp(i\delta) + 3\exp(-i\delta))|}$ --.

Column 15,
Line 30, "$a_k > 0$" should read -- $a_k \geq 0$ --; and
Line 39, "$0 \leq a_0 \leq a_1$." should read -- $0 \leq a_0 < a_1$. --.

Column 18,
Line 19, "follows.)" should read -- follows. --.

Column 19,
Line 64, "ensues" should read -- ensures --.

Column 20,
Equation (37) should read

-- $\epsilon^{(0)} = (2^{n-1} - t)a_0 + ta_1 > 2^{n-1}a_0 > O(2^{(n/2)-1})$, --.

Column 22,
Lines 8-10, should read

-- $j_{max} \sim \dfrac{\pi}{4}\sqrt{\dfrac{2^n}{t}} \sim O(2^{n/2})$. --; and

Line 31, "$x \in \{(0,1)^n\}$" should read -- $x \in \{0,1\}^n$ --.

Column 29,
Line 2, "can" should read -- can be --.

UNITED STATES PATENT AND TRADEMARK OFFICE
CERTIFICATE OF CORRECTION

PATENT NO. : 6,760,136 B2
APPLICATION NO. : 09/928499
DATED : July 6, 2004
INVENTOR(S) : Hiroo Azuma It is certified that error appears in the above-identified patent and that said Letters Patent is hereby corrected as shown below:

Column 30,
Line 55, "mechanical," should read -- mechanical --.

Signed and Sealed this

Fourth Day of July, 2006

JON W. DUDAS
*Director of the United States Patent and Trademark Office*